US012671826B2

(12) United States Patent
Yuan et al.

(10) Patent No.: US 12,671,826 B2
(45) Date of Patent: Jun. 30, 2026

(54) POINT CLOUD ENCODING AND DECODING METHODS, ENCODER, DECODER, AND COMPUTER STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Xiaohui Wang, Dongguan (CN); Lu Wang, Dongguan (CN); Qi Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 264 days.

(21) Appl. No.: 18/207,638

(22) Filed: Jun. 8, 2023

(65) Prior Publication Data

US 2023/0319294 A1      Oct. 5, 2023

Related U.S. Application Data

(63) Continuation of application No. PCT/CN2020/134654, filed on Dec. 8, 2020.

(51) Int. Cl.
*H04N 19/20*      (2014.01)
*H04N 19/147*      (2014.01)
(Continued)

(52) U.S. Cl.
CPC ........... *H04N 19/20* (2014.11); *H04N 19/147* (2014.11); *H04N 19/174* (2014.11); *H04N 19/184* (2014.11); *H04N 19/597* (2014.11)

(58) Field of Classification Search
CPC .... H04N 19/20; H04N 19/147; H04N 19/174; H04N 19/184; H04N 19/597
See application file for complete search history.

(56) References Cited

U.S. PATENT DOCUMENTS

| | | | |
|---|---|---|---|
| 10,911,787 B2 | 2/2021 | Tourapis | |
| 10,979,730 B2 | 4/2021 | Yea | |

(Continued)

FOREIGN PATENT DOCUMENTS

| | | | |
|---|---|---|---|
| CN | 109889840 A | 6/2019 | |
| CN | 110996098 A | 4/2020 | |

(Continued)

OTHER PUBLICATIONS

International Search Report in the international application No. PCT/CN2020/134654, mailed on Sep. 8, 2021.

(Continued)

*Primary Examiner* — Kyle M Lotfi
(74) *Attorney, Agent, or Firm* — BAYES PLLC

(57) ABSTRACT

Disclosed in embodiments of the present application are a point cloud encoding method, a point cloud decoding method, an encoder, a decoder, and a computer storage medium. The point cloud encoding method comprises: an encoder determining n target neighbouring points of a current point; determining a target prediction mode from k prediction modes on the basis of geometric information of the n target neighbouring points; determining a prediction value of attribute information of the current point according to the target prediction mode and attribute information of the n target neighbouring points; and encoding the current point according to the prediction value.

18 Claims, 15 Drawing Sheets

(51) Int. Cl.
   *H04N 19/174*     (2014.01)
   *H04N 19/184*     (2014.01)
   *H04N 19/597*     (2014.01)

(56)          References Cited

U.S. PATENT DOCUMENTS

| | | | | |
|---|---|---|---|---|
| 12,051,220 | B2 * | 7/2024 | Li | ............................ G06T 7/73 |
| 2019/0311499 | A1 | 10/2019 | Mammou et al. | |
| 2020/0021856 | A1 | 1/2020 | Tourapis et al. | |
| 2020/0105025 | A1 | 4/2020 | Yea et al. | |
| 2020/0137399 | A1 * | 4/2020 | Li | ........................ H04N 19/593 |
| 2020/0304823 | A1 | 9/2020 | Yea et al. | |
| 2022/0254057 | A1 | 8/2022 | Li | |
| 2023/0239517 | A1 * | 7/2023 | Nishi | ........................ G06T 9/00 |
| | | | | 375/240.12 |

FOREIGN PATENT DOCUMENTS

| | | | |
|---|---|---|---|
| CN | 111145090 | A | 5/2020 |
| CN | 111242997 | A | 6/2020 |
| WO | 2020191260 | A1 | 9/2020 |

OTHER PUBLICATIONS

Written Opinion of the International Search Authority in the international application No. PCT/CN2020/134654, mailed on Sep. 8, 2021.

Chuang Ma et al: "CE13.34 report on filter based attribute prediction scheme", 132. MPEG Meeting; Oct. 12, 2020-Oct. 16, 2020; Online; (Motion Picture Expert Group or ISO/IEC JTC1/SC29/WG11), No. m54951, Oct. 6, 2020 (Oct. 6, 2020), XP030292452, sections 1-3, in particular figures 1, 3 and 4. 6 pages.

Anonymous: "G-PCC codec description v8", 131. MPEG Meeting; Jun. 29, 2020-Jul. 3, 2020; Online; (Motion Picture Expert Group or ISO/IEC JTC1/SC29/WG11), No. n19525, Oct. 10, 2020 (Oct. 10, 2020), pp. 1-140, XP030292244, paragraph 3.8, in particular 3.8.11. 142 pages.

Supplementary European Search Report in the European application No. 20964539.9, mailed on Jan. 16, 2024. 10 pages.

* cited by examiner

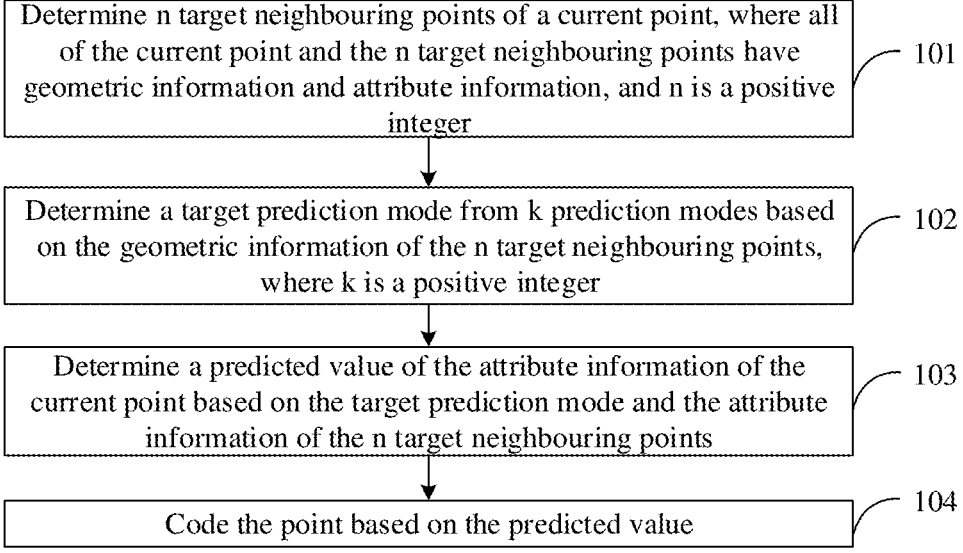

Determine n target neighbouring points of a current point, where all of the current point and the n target neighbouring points have geometric information and attribute information, and n is a positive integer — 101

Determine a target prediction mode from k prediction modes based on the geometric information of the n target neighbouring points, where k is a positive integer — 102

Determine a predicted value of the attribute information of the current point based on the target prediction mode and the attribute information of the n target neighbouring points — 103

Code the point based on the predicted value — 104

FIG. 5

| Sequence | End-to-End BD-AttrRate [%] | | |
|---|---|---|---|
| | Luma | Chroma Cb | Chroma Cr |
| boxer_viewdep_vox12 | -0.1% | -0.5% | -0.1% |
| dancer_vox11_00000001 | -0.3% | -0.4% | -0.2% |
| loot_viewdep_vox12 | -0.1% | -0.5% | -0.4% |
| loot_vox10_1200 | 0.1% | -0.3% | 0.2% |
| soldier_viewdep_vox12 | 0.1% | 0.0% | -0.1% |
| soldier_vox10_0690 | 0.1% | 0.2% | -0.1% |
| thaidancer_viewdep_vox12 | 0.3% | -0.1% | 0.0% |
| facade_00064_vox14 | 0.0% | -0.1% | 0.0% |
| facade_00064_vox20 | 0.0% | 0.0% | -0.1% |
| frog_00067_vox20 | 0.0% | 0.0% | -0.3% |
| ulb_unicorn_hires_vox20 | 0.0% | -0.3% | 0.0% |
| Overall average | 0.0% | -0.2% | -0.1% |

FIG. 6

| Sequence | End-to-End BD-AttrRate [%] | | |
|---|---|---|---|
| | Luma | Chroma Cb | Chroma Cr |
| boxer_viewdep_vox12 | -0.1% | -0.5% | -0.1% |
| dancer_vox11_00000001 | -0.3% | -0.4% | -0.2% |
| loot_viewdep_vox12 | -0.1% | -0.5% | -0.4% |
| Overall average | -0.1% | -0.4% | -0.3% |

FIG. 7

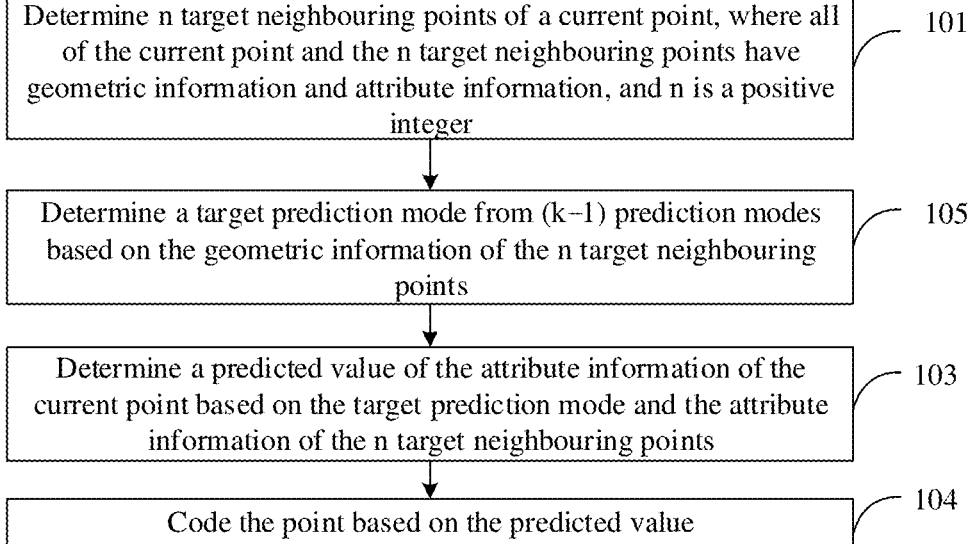

Determine n target neighbouring points of a current point, where all of the current point and the n target neighbouring points have geometric information and attribute information, and n is a positive integer — 101

Determine a target prediction mode from (k−1) prediction modes based on the geometric information of the n target neighbouring points — 105

Determine a predicted value of the attribute information of the current point based on the target prediction mode and the attribute information of the n target neighbouring points — 103

Code the point based on the predicted value — 104

FIG. 8

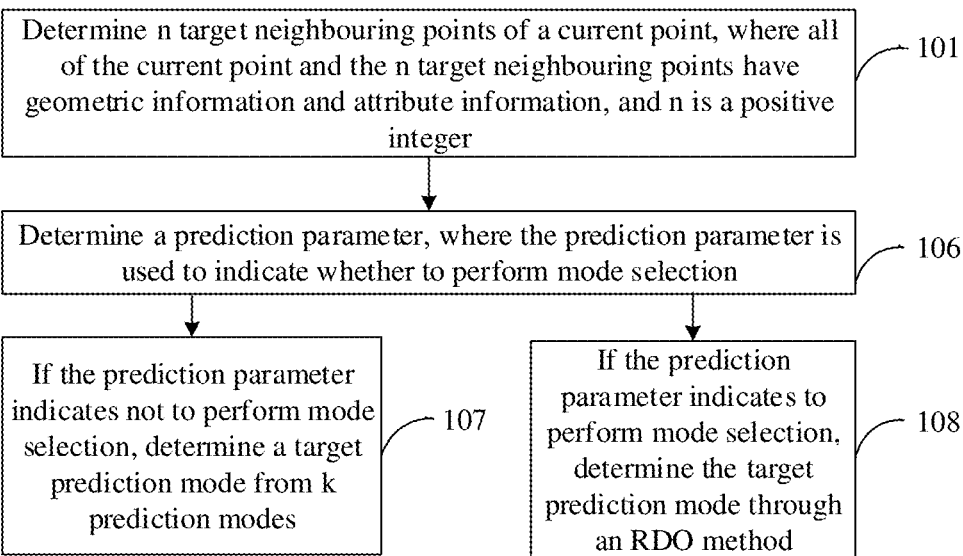

Determine n target neighbouring points of a current point, where all of the current point and the n target neighbouring points have geometric information and attribute information, and n is a positive integer — 101

Determine a prediction parameter, where the prediction parameter is used to indicate whether to perform mode selection — 106

If the prediction parameter indicates not to perform mode selection, determine a target prediction mode from k prediction modes — 107

If the prediction parameter indicates to perform mode selection, determine the target prediction mode through an RDO method — 108

FIG. 9

POINT CLOUD ENCODING AND DECODING METHODS, ENCODER, DECODER, AND COMPUTER STORAGE MEDIUM

CROSS-REFERENCE TO RELATED APPLICATION

This is a continuation of International Application No. PCT/CN2020/134654, filed on Dec. 8, 2020, entitled "POINT CLOUD ENCODING METHOD, POINT CLOUD DECODING METHOD, ENCODER, DECODER, AND COMPUTER STORAGE MEDIUM", which is incorporated herein by reference in its entirety.

TECHNICAL FIELD

Embodiments of the present disclosure relate to video encoding and decoding, and in particular, to point cloud encoding and decoding methods, encoders, decoders, and computer storage media.

BACKGROUND

In a geometry-based point cloud compression (G-PCC) encoder framework, geometric information of point clouds and attribute information corresponding to each of the point clouds are separately encoded. After geometry encoding, the geometric information is reconstructed, and encoding of the attribute information depends on the reconstructed geometric information.

At present, the encoding of the attribute information is mainly encoding of colour information. First, the colour information is transformed from an RGB colour space to a YUV colour space. Then, the reconstructed geometric information is used to recolour the point cloud such that attribute information has not been coded corresponds to the reconstructed geometric information. Encoding of the colour information mainly includes two transformation methods. One is distance-based lifting transform that depends on level of detail (LOD) division. The other is region-adaptive hierarchical transform (RAHT) that is directly carried out. In both methods, the colour information is transformed from a spatial domain to a frequency domain to obtain high-frequency coefficients and low-frequency coefficients, and the coefficients are quantized and encoded to generate a binary bitstream.

However, in a related colour prediction technology, after an LOD is generated, a current point is predicted by using colour information of neighbouring points. This results in inaccurate prediction and reduces coding and decoding efficiency.

BRIEF DESCRIPTION OF THE DRAWINGS

FIG. 5 is a first schematic implementation flowchart of point cloud encoding;
FIG. 6 is a first schematic diagram of prediction performance;
FIG. 7 is a second schematic diagram of prediction performance;

FIG. 8 is a second schematic implementation flowchart of point cloud encoding;
FIG. 9 is a third schematic implementation flowchart of point cloud encoding.

DETAILED DESCRIPTION

Figure 1:
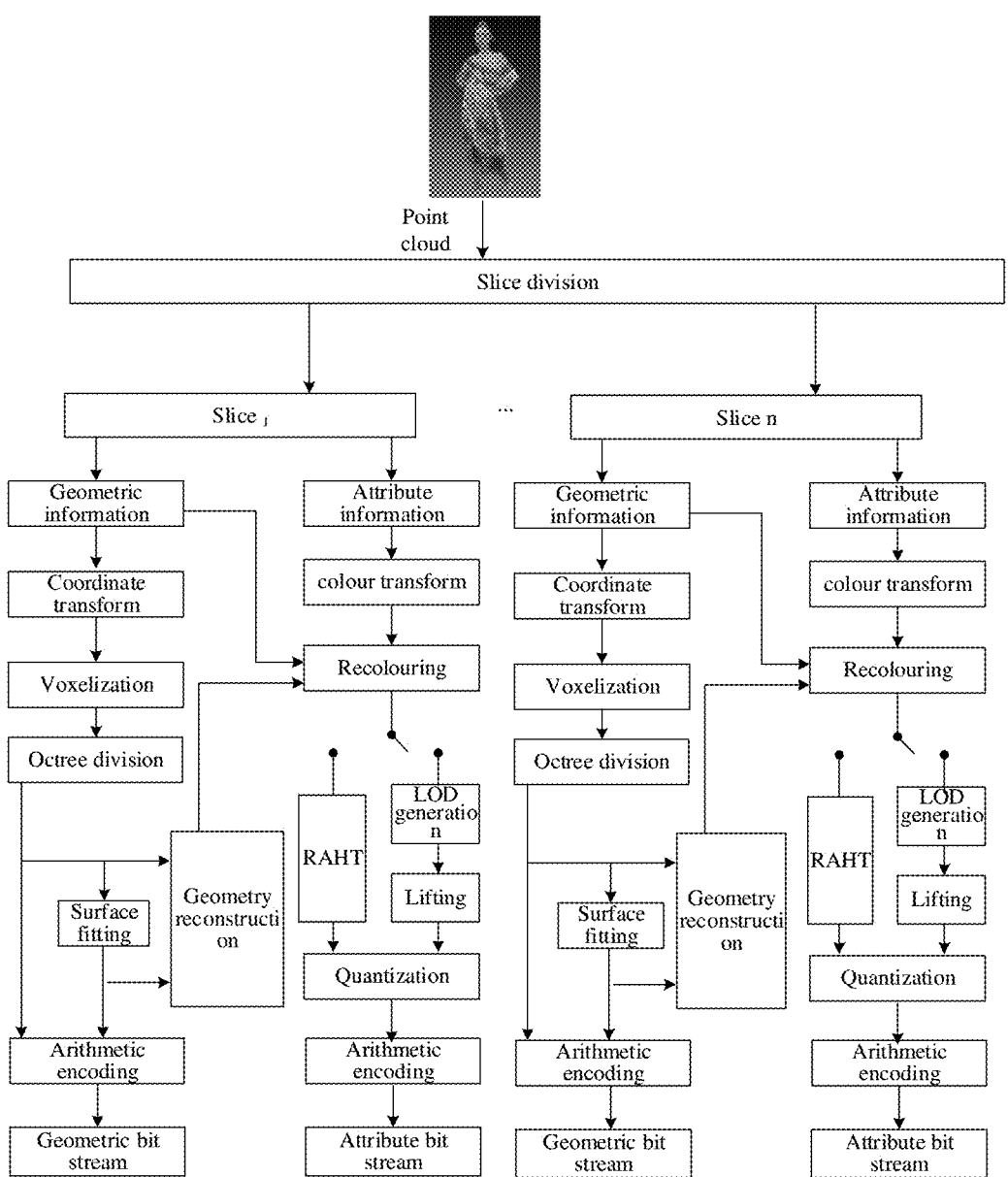
FIG. 1 is a flow block diagram of G-PCC encoding.

To understand features and technical content of the embodiments of the present disclosure in more detail, implementation of the embodiments of the present disclosure is described in detail below with reference to the accompanying drawings. The accompanying drawings are only for reference and description, and are not intended to limit the embodiments of the present disclosure.

Embodiments of the present disclosure provide point cloud encoding and decoding methods, an encoder, a decoder, and a computer storage medium, which can make full use of attribute information and geometric information of neighbouring points to improve prediction accuracy and greatly improve encoding and decoding efficiency.

The technical solutions in the embodiments of the present disclosure may be implemented as follows.

According to a first aspect, an embodiment of the present disclosure provides a point cloud encoding method, applied to an encoder and including: determining n target neighbouring points of a current point, where each of the current point and the n target neighbouring points have geometric information and attribute information, and n is a positive integer; determining a target prediction mode from k prediction modes based on the geometric information of the n target neighbouring points, where k is a positive integer; determining a predicted value of the attribute information of the current point based on the target prediction mode and the attribute information of the n target neighbouring points; and encoding the current point based on the predicted value.

According to a second aspect, an embodiment of the present disclosure provides a point cloud decoding method, applied to a decoder and including: parsing a bitstream and determining a mode parameter, where the mode parameter is used to indicate predicting attribute information of a current point by using a target prediction mode; if the target prediction mode is a $k^{th}$ mode in k prediction modes, determining n target neighbouring points of the current point, and determining a model parameter of a prediction model based on geometric information and attribute information of the n target neighbouring points, where k and n are positive integers; and determining a predicted value of the attribute information of the current point through the prediction model based on the model parameter and geometric information of the current point.

According to a third aspect, an embodiment of the present disclosure provides an encoder. The encoder includes a first determining portion and an encoding portion. The first determining portion is configured to determine n target neighbouring points of a current point, where the current point and the n target neighbouring points have geometric information and attribute information, and n is a positive integer; determine a target prediction mode from k prediction modes based on the geometric information of the n target neighbouring points, where k is a positive integer; and determine a predicted value of the attribute information of the current point based on the target prediction mode and the attribute information of the n target neighbouring points. The encoding portion is configured to encode the current point based on the predicted value.

According to a fourth aspect, an embodiment of the present disclosure provides an encoder. The encoder includes a first processor and a first memory storing instructions executable by the first processor. The instructions, when executed by the first processor, implement the foregoing point cloud encoding method.

According to a fifth aspect, an embodiment of the present disclosure provides a decoder. The decoder includes a parsing portion and a second determining portion. The parsing portion is configured to parse a bitstream. The second determining portion is configured to determine a mode parameter, where the mode parameter is used to indicate predicting attribute information of a current point by using a target prediction mode; if the target prediction mode is a $k^{th}$ mode in k prediction modes, determine n target neighbouring points of the current point, and determine a model parameter of a prediction model based on geometric information and attribute information of the n target neighbouring points, where k and n are positive integers; and determine a predicted value of the attribute information of the current point through the prediction model based on the model parameter and geometric information of the current point.

According to a sixth aspect, an embodiment of the present disclosure provides a decoder. The decoder includes a second processor and a second memory storing an instruction executable by the second processor. The instruction, when executed by the second processor, implements the foregoing point cloud decoding method.

According to a seventh aspect, an embodiment of the present disclosure provides a computer storage medium. The computer storage medium stores a computer program. The computer program implements the foregoing point cloud encoding method when executed by a first processor, or implements the foregoing point cloud decoding method when executed by a second processor.

The embodiments of the present disclosure disclose point cloud encoding and decoding methods, the encoder, the decoder, and the computer storage medium. The encoder determines n target neighbouring points of a current point, where each of the current point and the n target neighbouring points have geometric information and attribute information, and n is a positive integer; determines a target prediction mode from k prediction modes based on the geometric information of the n target neighbouring points, where k is a positive integer; determines a predicted value of the attribute information of the current point based on the target prediction mode and the attribute information of the n target neighbouring points; and encodes the current point based on the predicted value. The decoder parses a bitstream and determines a mode parameter, where the mode parameter is used to indicate predicting attribute information of a current point by using a target prediction mode; if the target prediction mode is a $k^{th}$ mode in k prediction modes, determines n target neighbouring points of the current point, and determines a model parameter of a prediction model based on geometric information and attribute information of the n target neighbouring points, where k and n are positive integers; and determines a predicted value of the attribute information of the current point through the prediction model based on the model parameter and geometric information of the current point. In other words, a new prediction mode for predicting attribute information of a current point by using geometric information of neighbouring points is added in the point cloud encoding and decoding methods provided in the present disclosure. This can make full use of attribute information and the geometric information of the neighbouring points when predicting the attribute information of the current point, to improve prediction accuracy and greatly improve encoding and decoding efficiency.

In the embodiments of the present disclosure, in a G-PCC encoder framework, after a point cloud input to a three-dimensional image model is divided into slices, each slice is independently encoded.

FIG. 1 is a flow block diagram of G-PCC encoding. As shown in FIG. 1, the flow block diagram of G-PCC encoding is applied to a point cloud encoder. For point cloud data to be encoded, the point cloud data is first divided into a plurality of slices. In each slice, geometric information of point clouds and attribute information corresponding to each of the point clouds are separately encoded. During geometry encoding, coordinate transformation is performed on the geometric information such that all point clouds are contained in a bounding box, and then quantization is performed. The quantization mainly plays a role of scaling. Due to rounding during the quantization, some point clouds have the same geometric information. It is determined based on parameters whether to remove duplicate points. The process of performing quantization and removing the duplicate points is also referred to as a voxelization process. Next, octree division is performed on the bounding box. In a process of encoding the geometric information based on an octree, the bounding box is equally divided into 8 sub-cubes. Sub-cubes that are not empty (containing points in the point cloud) are divided into eight equal parts until the divided leaf nodes are 1×1×1 unit cubes. Arithmetic encoding is performed on points in the leaf nodes to generate a binary geometric bit stream, namely, a geometric bitstream. In a process of encoding the geometric information based on a triangle soup (trisoup), octree division is also performed first. Different from octree-based geometric information encoding, the trisoup does not need to divide the point cloud into 1×1×1 unit cubes level by level, but into blocks until a side length of the block is W. Based on a surface formed through distribution of the point cloud in each block, at most twelve vertices are generated through intersection of the surface with twelve edges of the block. Arithmetic encoding is performed on the vertices (surface fitting is performed based on the vertices) to generate a binary geometric bit stream, namely, a geometric bitstream. The vertices are also used for geometry reconstruction. Reconstructed geometric information is used for encoding attributes of the point cloud.

During attribute encoding, after the geometry encoding is completed and the geometric information is reconstructed, colour transformation is performed to transform colour information (namely, the attribute information) from a RGB colour space to a YUV colour space. Then, the reconstructed geometric information is used to recolour the point cloud such that attribute information which has not been encoded corresponds to the reconstructed geometric information. The attribute encoding is mainly encoding of the colour information. The encoding of the colour information mainly includes two transformation methods. One is distance-based lifting transform that depends on LOD division. The other is RAHT that is directly carried out. In both methods, the colour information is transformed from a spatial domain to a frequency domain to obtain high-frequency coefficients and low-frequency coefficients, and the coefficients are quantized to obtain quantized coefficients. Finally, after slice synthesis is performed on geometry encoding data subjected to the octree division and surface fitting and attribute encoding data obtained by processing the quantized coefficients, vertex coordinates of each block are sequentially encoded (that is, arithmetically encoded) to generate a binary attribute bit stream, namely, an attribute bitstream.

Figure 2:
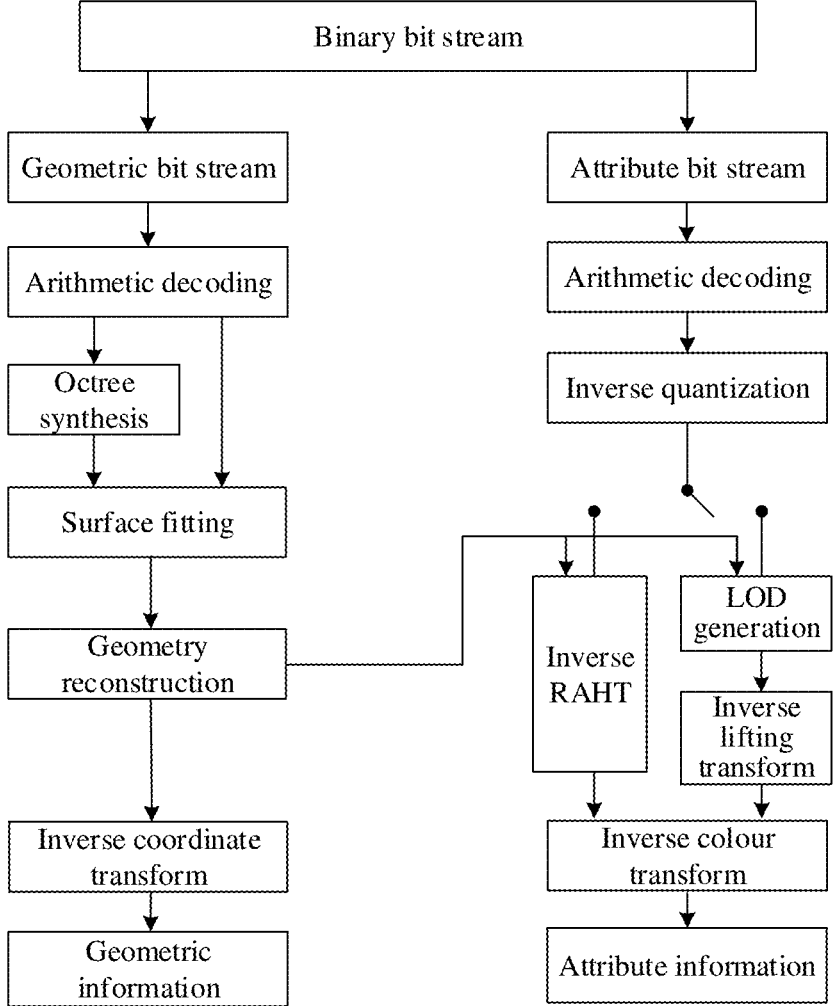
FIG. 2 is a flow block diagram of G-PCC decoding.

FIG. 2 is a flow block diagram of G-PCC decoding. As shown in FIG. 2, the flow block diagram of G-PCC decoding is applied to a point cloud decoder. For an obtained binary bitstream, a geometric bit stream and an attribute bit stream in the binary bitstream are independently decoded respectively. When decoding the geometric bit stream, geometric information of a point cloud is obtained through arithmetic decoding, octree synthesis, surface fitting, geometry reconstruction, and inverse coordinate transformation in sequence. When decoding the attribute bit stream, attribute information of the point cloud is obtained through arithmetic decoding, inverse quantization, inverse LOD-based lifting transform or inverse RAHT, and inverse colour transformation in sequence. A three-dimensional image model of point cloud data to be encoded is restored based on the geometric information and the attribute information.

In the flow chart diagram of G-PCC encoding shown in FIG. 1, LOD division is mainly used in predicting transform and lifting transform in point cloud attribute transform. Distance-based LOD division is described in detail below. Specifically, LOD division is to divide an input point cloud into different LODs (denoted by $R_l$, where l=0, 1, . . . , N−1) through a set of distance thresholds (denoted by $d_l$, where l=0, 1, . . . , N−1) that is, to divide points in the point cloud into different sets $R_l$. The distance thresholds may be custom values. The distance thresholds need to meet two conditions: $d_l < d_{l-1}$ and $d_{l-1} = 0$.

LOD division is performed after geometry reconstruction of the point cloud, and at this time, geometric coordinate information of the point cloud can be obtained directly. LOD division may be applied to both a point cloud encoder and a point cloud decoder. A specific process is as follows.

(1) All points in the point cloud are placed in an "unvisited" point set, and a "visited" point set (denoted by V) is initialized as an empty set.

(2) LOD division is performed through continuous iteration, and a process of generating an LOD corresponding to an $l^{th}$ iteration is as follows.

a. All points in the point cloud are traversed through iteration.

b. If a point has been traversed, the point is ignored.

c. Otherwise, a distance from the point to each point in the set V is calculated, and a shortest distance is recorded as D.

d. If the distance D is greater than or equal to a threshold, the point is added to the LOD and the set V.

e. A process from a to d is repeated until at least one point in the point cloud is traversed.

(3) An $l^{th}$ LOD set, namely, LODl, is obtained by merging points in LODs $R_0$, $R_1$, . . . , and $R_l$.

(4) A process from (1) to (3) is continuously iterated until all LODs are generated or all points are traversed.

Figure 3:
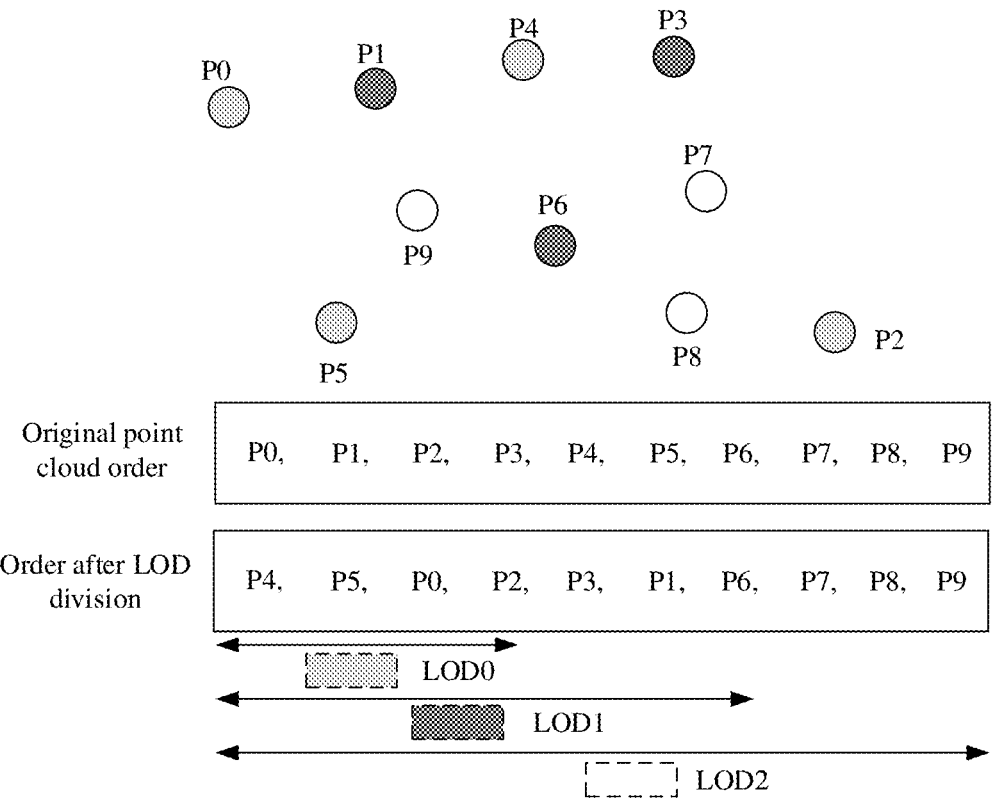
FIG. 3 is a first schematic structural diagram of an LOD generation process.

FIG. 3 is a first schematic structural diagram of an LOD generation process. As shown in FIG. 3, a point cloud includes 10 points: P0, P1, P2, P3, P4, P5, P6, P7, P8, and P9. LOD division is performed based on a distance threshold such that an LOD0 set includes P4, P5, P0, and P2 in sequence, an LOD1 set includes P4, P5, P0, P2, P3, P1, and P6 in sequence, and an LOD2 set includes P4, P5, P0, P2, P3, P1, P6, P7, P8, and P9 in sequence.

In the related art, a solution for LOD division based on Morton codes is mentioned. Compared with an original solution of traversing all points for LOD division, the solution for LOD division based on Morton codes can reduce calculation complexity.

Specifically, Morton codes are also referred to as z-order codes because encoding is performed in a spatial z-order. A variable $P_i$ represents a point in an input point cloud. A variable $M_i$ is a Morton code related to $P_i$, where i=1, 2, . . . , N. A specific process of calculating a Morton code is described as follows. For a three-dimensional coordinate in which each component is represented by a d-bit binary number, three coordinate components are represented as follows.

$$x = \sum_{l=1}^{d} 2^{d-l} x_l, \ y = \sum_{l=1}^{d} 2^{d-l} y_l, \text{ and } z = \sum_{l=1}^{d} 2^{d-l} z_l.$$

Where $x_l$, $y_l$, $z_l \in \{0, 1\}$ are binary numbers corresponding to a most significant bit (l=1) to a least significant bit (l=d) of x, y, and z respectively. Morton codes M is obtained by sequentially arranging $x_l$, $y_l$, $z_l$ from the most significant bit to the least significant bit of x, y, and z in a staggered manner. The following formula is used to calculate M.

$$M = \sum_{l=1}^{d} 2^{3(d-l)}(4x_l + 2y_l + z_l) = \sum_{l=1}^{3d} 2^{3d-l'} m_{l'} \tag{1}$$

Where $m_{l'} \in \{0, 1\}$ is a value of the most significant bit (l'=1) to the least significant bit (l'=3d) of M. After the Morton code M of each point in the point cloud is obtained, the points in the point cloud are arranged in an ascending order of Morton codes.

Further, D0 (a threshold of an initial distance) and ρ (a distance threshold ratio when adjacent LODs are obtained through division) are initial parameters defined by a user, where ρ>1. It is assumed that I represents indexes of all points. During a $k^{th}$ iteration, for a point in LODk, LOD0 to LODk−1 are searched for nearest neighbours, namely, points with shortest distances, where k=1, 2, . . . , and N−1. N is a total number of LODs obtained through division. When k=0, for a point in LOD0, LOD0 is searched for nearest neighbours during a $0^{th}$ iteration. A specific process is as follows.

(1) A distance threshold is initialized.

(2) During the $k^{th}$ iteration, L(k) stores points belonging to a $k^{th}$ LOD, and O(k) stores a point set of an LOD higher than LODk. A process of calculating L(k) and O(k) is as follows.

First, O(k) and L(k) are initialized as empty sets.

Then, traversing is performed in an index order of points in I during each iteration. Specifically, during each traversal, geometric distances from a current point to all points in a specific range in the set O(k) are calculated. The set O(k) is searched for an index of a first point in I, of which a Morton code is greater than a Morton code corresponding to the current point. Searching is performed within a search range SR1 of the index (SR1 represents a search range based on the Morton code and usually has a value of 8, 16, or 64). If a point with a distance less than the threshold from the current point is found in the range, the current point is added into the set L(k). Otherwise, the current point is added to the set O(k).

(3) During each iteration, the sets L(k) and O(k) are separately calculated, and points in O(k) are used to predict points in the set L(k). It is assumed that R(k) =L(k)\L(k−1). In other words, R(k) represents a difference set of LOD(k−1) and LOD(k). For a point in the set R(k), h predicted nearest neighbours in the set O(k) are found (usually, h may be set to 3). A specific process of searching for the nearest neighbours is as follows.

a. A Morton code corresponding to a point Pi in the set R(k) is Mi.

b. An index j of a first point of which a Morton code is greater than the Morton code Mi corresponding to the point Pi is searched for in the set O(k).

c. Nearest neighbours of the point Pi are searched for in a search range [j−SR2, j+SR2] in the set O(k) based on the index j (SR2 represents a search range and usually has a value of 8, 16, 32, or 64).

(4) A process from (1) to (3) is iterated until all points in I are traversed.

Figure 4:
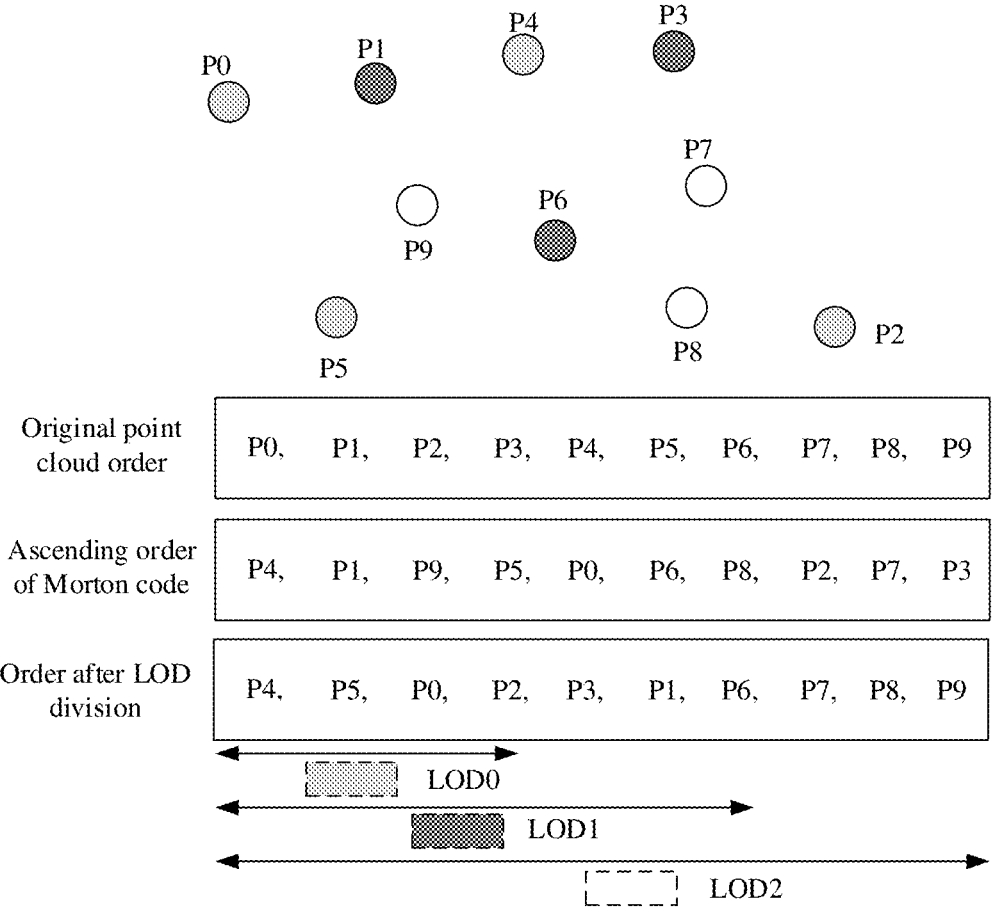
FIG. 4 is a second schematic structural diagram of an LOD generation process.

FIG. 4 is a second schematic structural diagram of an LOD generation process. As shown in FIG. 4, a point cloud includes 10 points: P0, P1, P2, P3, P4, P5, P6, P7, P8, and P9. LOD division is performed based on Morton codes. First, the points are arranged in ascending order of the Morton codes. The order of the 10 points is P4, P1, P9, P5, P0, P6, P8, P2, P7, and P3. Then, nearest neighbours are searched for such that an LOD0 set still includes P4, P5, P0, and P2 in sequence, an LOD1 set still includes P4, P5, P0, P2, P3, P1, and P6 in sequence, and an LOD2 set still includes P4, P5, P0, P2, P3, P1, P6, P7, P8, and P9 in sequence.

For lifting transform, LODs are first constructed by using a point cloud sorted based on Morton codes. That is, the sorted points are down-sampled based on a preset number of LODs. The obtained points after each sampling form an LOD in a descending order of sampling distance until the whole LODs are constructed. Then, neighbouring points of a point in the point cloud are searched for in an order of the LODs. A weighted average of attribute values of all neighbouring points is used as a predicted attribute value. A weight of each neighbouring point is a reciprocal of a square of a geometric coordinate Euclidean distance between the current point and the neighbouring point of the current point. Finally, an attribute residual is obtained by subtracting the predicted attribute value from an actual attribute value of the current point.

For lifting transform, after the LODs are constructed, for each point, a maximum of K nearest neighbouring points are searched for through a k-nearest neighbour (KNN) algorithm. There are K+1 prediction modes, in which attribute values of a first, second, . . . , and $K^{th}$ nearest neighbouring points are used as prediction reference values respectively, and a weighted average of attribute values of the K nearest neighbouring points is used as a prediction reference value. The weight of each nearest neighbouring point is the reciprocal of the square of the geometric coordinate Euclidean distance between the current point and the nearest neighbouring point of the current point. Rate-distortion optimization (RDO) cost values are calculated respectively for the K+1 prediction reference values and corresponding modes, and a predicted attribute value corresponding to a smallest cost value is used as the predicted attribute value of the current point.

For example, a colour prediction technology in predicting transform applied to point cloud colour encoding may be implemented through the following process.

1. Euclidean distances between a current point and neighbouring points are calculated to obtain 3 nearest neighbours of the current point. The nearest neighbours are used as a neighbouring point set of the current point.

2. A colour of the current point is predicted based on colour information of the neighbouring point set. There are 4 prediction modes.

In other words, the Euclidean distances between the current point and the neighbouring points may be calculated first. 3 neighbouring points with shortest distances are selected as the neighbouring point set of the current point. The colour of the current point is predicted in 4 preset prediction modes based on the colour information of the neighbouring point set.

Specifically, in a prediction mode 0, namely, predMode=0 (0 is assigned to predMode), weighted averaging is performed on colours of the 3 neighbouring points in the neighbouring point set with a reciprocal of the Euclidean distance between the neighbouring point and the current point as a weight to obtain a predicted colour value of the current point. In a prediction mode 1, namely, predMode=1, colour information of a $1^{st}$ neighbouring point ($1^{st}$ nearest point) is used as the predicted value. In a prediction mode 2, namely, predMode=2, colour information of a $2^{nd}$ neighbouring point ($2^{nd}$ nearest point) is used as the predicted value. In a prediction mode 3, namely, predMode=3, colour information of a $3^{rd}$ neighbouring point ($3^{rd}$ nearest point) is used as the predicted value.

Table 1 shows prediction modes in the relate art and a number of bits idxBits required for encoding in each prediction mode.

TABLE 1

| Prediction mode | Predicted value | idxBits |
|---|---|---|
| 0 | average | 1 |
| 1 | $1^{st}$ nearest point | 2 |
| 2 | $2^{nd}$ nearest point | 3 |
| 3 | $3^{rd}$ nearest point | 3 |

After predicted colour values in the 4 prediction modes are calculated, RDO selection may be performed from the 4 prediction modes through an RDO technology, to select an optimal prediction mode to predict the colour information of the current point, and entropy encoding may be performed on information of the optimal prediction mode by using an arithmetic encoder.

However, after the LOD is generated, a related colour prediction technology is used to predict the current point by using the colour information of the neighbouring points, and does not make full use of geometric information of the neighbouring points of the current point. This results in inaccurate prediction and reduces the encoding and decoding efficiency.

The embodiments of the present disclosure provide point cloud encoding and decoding methods, an encoder, a decoder, and a computer storage medium. A new prediction mode for predicting attribute information of a point by using geometric information of neighbouring points is added in the point cloud encoding and decoding methods provided in the present disclosure. This can make full use of attribute information and the geometric information of the neighbouring points when predicting the attribute information of the point, to improve prediction accuracy and greatly improve the encoding and decoding efficiency.

It can be understood that in the present disclosure, the point cloud encoding method in the embodiments of the present disclosure may be applied after LOD generation shown in FIG. 1. Correspondingly, the point cloud decoding method in the embodiments of the present disclosure may be applied after LOD generation shown in FIG. 2. In other words, the point cloud encoding and decoding methods in the embodiments of the present disclosure may be applied to a video encoding system, a video decoding system, or even both of the video encoding system and the video decoding system. This is not specifically limited in the embodiments of the present disclosure.

The following describes the technical solutions in the embodiments of the present disclosure with reference to the accompanying drawings in the embodiments of the present disclosure.

An embodiment of the present disclosure provides a point cloud encoding method. FIG. 5 is a first schematic implementation flowchart of point cloud encoding. As shown in FIG. 5, in the embodiments of the present disclosure, a method for encoding a point cloud by an encoder may include the following operations.

In 101, n target neighbouring points of a current point are determined. The current point and the n target neighbouring points have geometric information and attribute information, and n is a positive integer.

In the embodiments of the present disclosure, the encoder may first determine the n target neighbouring points in all encoded neighbouring points around the current point, and n pieces of geometric information and n pieces of attribute information corresponding to the n target neighbouring points, where n is a positive integer, that is, n=1, 2, 3, . . . .

It should be noted that in the embodiments of the present disclosure, the encoder may predict the attribute information of the current point by using the geometric information and the attribute information of the n target neighbouring points and the geometric information of the current point.

It can be understood that in the embodiments of the present disclosure, the current point may be a to-be-encoded point in the point cloud. There are a plurality of encoded points around the current point. Specifically, when determining the n target neighbouring points, the encoder may select the n target neighbouring points from all encoded neighbouring points around the current point. In other words, the n target neighbouring points are encoded points around the current point.

It should be noted that in the embodiments of the present disclosure, when determining the n target neighbouring points of the current point, the encoder determines a plurality of distance parameters between a plurality of encoded points in the point cloud and the current point, and then determines the n target neighbouring points from the plurality of points based on the plurality of distance parameters. The distance parameters may represent distances between the current point and other points in the point cloud.

In other words, in the embodiments of the present disclosure, when determining the n target neighbouring points of the current point, the encoder may calculate distance parameters between the current point and all surrounding encoded neighbouring points, and then select the n target neighbouring points from all the encoded neighbouring points based on the distance parameters.

For example, in the embodiments of the present disclosure, after calculating the distance parameters between the current point and all surrounding encoded neighbouring points, the encoder may determine n encoded neighbouring points corresponding to n smallest distance parameters as the n target neighbouring points. For example, distance parameters between the current point and 8 surrounding encoded neighbouring points A1, A2, A3, A4, A5, A6, A7, and A8 are a1, a2, a3, a4, a5, a6, a7, and a8, respectively. If a1<a2<a3<a4<a5<a6<a7<a8, the encoder may determine the neighbouring points A1, A2, A3, and A4 as 4 target neighbouring points of the current point.

In other words, in the present disclosure, when determining the n target neighbouring points of the current point, the encoder may determine distance parameters between the current point and one or more candidate neighbouring points in the point cloud, and then determine the n target neighbouring points from the one or more candidate neighbouring points based on the distance parameters. The distance parameter indicates a distance between two points in the point cloud.

It can be understood that in the embodiments of the present disclosure, the distance parameter between the current point and each encoded neighbouring point calculated by the encoder may be a Euclidean distance, a cosine distance, or the like between the two points. This is not specifically limited in the present disclosure. For example, in the present disclosure, the distance parameter indicates a Euclidean distance between two points in the point cloud.

It should be noted that in the embodiments of the present disclosure, when determining the n target neighbouring points of the current point, the encoder may further sort the n neighbouring points, and sequentially determine a first neighbouring point to an $n^{th}$ neighbouring point. Specifically, the encoder may sequentially determine the first neighbouring point to the $n^{th}$ neighbouring point from a plurality of points in the point cloud in an ascending order of the distance parameters.

For example, in the present disclosure, the distance parameters between the point and the 8 surrounding encoded neighbouring points A1, A2, A3, A4, A5, A6, A7, and A8 are a1, a2, a3, a4, a5, a6, a7, and a8, respectively. If a1<a2<a3<a4<a5<a6<a7<a8, the encoder may determine the neighbouring point A1 as the first neighbouring point, the neighbouring point A2 as the second neighbouring point, the neighbouring point A3 as the third neighbouring point, and the neighbouring point A4 as the fourth neighbouring point.

In other words, in the present disclosure, the encoder may sequentially determine the first neighbouring point to the $n^{th}$ neighbouring point from the candidate neighbouring points in an ascending order of distances indicated by the distance parameters. The encoder may determine index numbers of the n target neighbouring points in an ascending order of the distance parameters. For example, an index number of the first neighbouring point is 1, and an index number of the $n^{th}$ neighbouring point is n.

Further, in the embodiments of the present disclosure, any one of the n target neighbouring points corresponds to one piece of geometric information and one piece of attribute information. The geometric information represents a spatial position of a neighbouring point, and the attribute information represents a reconstructed attribute value of a neighbouring point.

It should be noted that in the embodiments of the present disclosure, the attribute information may include colour information. Specifically, the attribute information may be an attribute value of any colour space. For example, the attribute information may be an attribute value of an RGB space, an attribute value of a YUV space, or an attribute value of a YCbCr space. This is not specifically limited in the present disclosure.

For example, in the present disclosure, the encoder may determine 3 target neighbouring points corresponding to the current point. 3 pieces of geometric information corresponding to the 3 target neighbouring points may be P1(x1, y1, z1), P2(x2, y2, z2), and P3(x3, y3, z3) respectively.

For example, in the present disclosure, if 3 pieces of attribute information corresponding to the 3 target neighbouring points of the current point are attribute values of the RGB space, the 3 pieces of attribute information may be C1(R1, G1, B1), C2(R2, G2, B2), and C3(R3, G3, B3) respectively.

It should be noted that in the embodiments of the present disclosure, the attribute information of the n target neighbouring points may be encoded reconstructed attribute values. The attribute information may be the colour information, reflectivity, or the like. This is not limited in the present disclosure.

In 102, a target prediction mode is determined from k prediction modes based on the geometric information of the n target neighbouring points, where k is a positive integer.

In an embodiment of the present disclosure, after determining the n target neighbouring points of the current point, the encoder may further determine the target prediction mode from the k prediction modes based on the geometric information of the n target neighbouring points.

It can be understood that in the present disclosure, the k prediction modes are used to predict the attribute information of the current point by using the n pieces of attribute information and the n pieces of geometric information of the n target neighbouring points.

It should be noted that in the embodiments of the present disclosure, k is a positive integer. That is, the encoder may determine the target prediction mode from one or more prediction modes based on the geometric information of the n target neighbouring points.

Further, in the embodiments of the present disclosure, a first mode in the k prediction modes indicates that a predicted value of the attribute information of the current point is determined based on a weighted average of the geometric information of the n target neighbouring points. Specifically, the first mode in the k prediction modes may be used to predict the attribute information of the current point by using the weighted average of the n pieces of geometric information of the n target neighbouring points.

Further, in the embodiments of the present disclosure, an $m^{th}$ mode in the k prediction modes indicates that the predicted value of the attribute information of the current point is determined based on attribute information of a neighbouring point of which the index number is (m−1) in the n target neighbouring points, where m is an integer greater than 1 and less than or equal to (n+1). Specifically, the $m^{th}$ mode in the k prediction modes is used to predict the attribute information of the current point by using geometric information of an $(m-1)^{th}$ neighbouring point in the n target neighbouring points.

Further, in the embodiments of the present disclosure, a $k^{th}$ mode in the k prediction modes indicates that the predicted value of the attribute information of the current point is determined based on the geometric information and the attribute information of the n target neighbouring points. Specifically, the $k^{th}$ mode in the k prediction modes is used to predict the attribute information of the current point by using the n pieces of geometric information and the n pieces of attribute information of the n target neighbouring points.

Further, in the embodiments of the present disclosure, when determining the target prediction mode from the k prediction modes, the encoder may select the target prediction mode through an RDO method.

For example, in the embodiments of the present disclosure, when determining the target prediction mode from the k prediction modes based on the geometric information of the n target neighbouring points, the encoder may determine k cost values corresponding to the k prediction modes, and then determine a prediction mode corresponding to a smallest cost value in the k cost values as the target prediction mode.

It can be understood that in the embodiments of the present disclosure, in an actual encoder implementation process, the encoder usually uses a fast RDO algorithm. That is, the encoder does not need to calculate the k cost values corresponding to all k prediction modes.

For example, in the embodiments of the present disclosure, when determining the target prediction mode from the k prediction modes based on the geometric information of the n target neighbouring points, the encoder may firstly determine p cost values corresponding to p prediction modes respectively in the k prediction modes, where p is an integer greater than or equal to 1 and less than or equal to k. If a $p^{th}$ cost value in the p cost values meets a preset condition, the encoder may determine the target prediction mode of the current point based on the p cost values.

In other words, in the present disclosure, the encoder may calculate cost values for only some of the k prediction modes, such as the p prediction modes, and determine the target prediction mode of the current point based on the some cost values, such as the p cost values.

For example, in the present disclosure, after calculating the p cost values corresponding to the p prediction modes respectively, the encoder may determine a decrement between the $p^{th}$ cost value and a $(p-1)^{th}$ cost value in the p cost values. If the decrement is less than a preset threshold, the encoder may use the $p^{th}$ prediction mode corresponding to the $p^{th}$ cost value as the target prediction mode of the current point.

In other words, in the present disclosure, if the decrement of the $p^{th}$ cost value relative to the $(p-1)^{th}$ cost value is less than the preset threshold, the encoder may use the $p^{th}$ prediction mode as the target prediction mode of the current point.

For example, in the embodiments of the present disclosure, after the encoder calculates the p cost values corresponding to the p prediction modes, if the $p^{th}$ cost value is greater than the $(p-1)^{th}$ cost value in the p cost values, the encoder may use a $(p-1)^{th}$ prediction mode corresponding to the $(p-1)^{th}$ cost value as the target prediction mode of the current point.

In other words, in the present disclosure, if the $p^{th}$ cost value is greater than the $(p-1)^{th}$ cost value, the encoder may use the $(p-1)^{th}$ prediction mode in the k prediction modes as the target prediction mode of the current point.

It should be noted that in the embodiments of the present disclosure, if p is 1, when determining the target prediction mode based on the $p^{th}$ cost value and the $(p-1)^{th}$ cost value, the encoder needs to first determine the $(p-1)^{th}$ cost value, namely, a $0^{th}$ cost value.

Further, in the embodiments of the present disclosure, when determining the $0^{th}$ cost value, the encoder may determine operation precision, determine a maximum positive integer corresponding to the operation precision, and set the $0^{th}$ cost value to the maximum positive integer. The operation precision is used to calculate the cost values.

In other words, in the present disclosure, the $0^{th}$ cost value is set to the maximum positive integer corresponding to the operation precision used to calculate the cost values.

For example, in the present disclosure, if the operation precision used to calculate the cost value is 8, the maximum integer corresponding to the operation precision is $2^8-1$. In other words, the maximum integer is 255. The encoder may set the $0^{th}$ cost value to 255.

For example, in the present disclosure, if the operation precision used to calculate the cost value is d bits, the encoder may determine the $0^{th}$ cost value through left bit shifting. In other words, $(1<<d)-1$ is determined as the $0^{th}$ cost value, where $<<$ represents left bit shifting.

Further, in the embodiments of the present disclosure, when determining the target prediction mode, the encoder may not only directly select the target prediction mode through the RDO method, but also determine whether to use the RDO method before using the RDO method.

In other words, in the embodiments of the present disclosure, the encoder may firstly determine whether to use the RDO method, and then select a manner of determining the target prediction mode based on a determining result.

For example, in the present disclosure, the encoder may determine a colour difference parameter of the n target neighbouring points, where the colour difference parameter is used to select a prediction mode; and then determine, based on the colour difference parameter and a preset colour difference threshold, whether to use the RDO method. Specifically, if the colour difference parameter is less than the preset colour difference threshold, the encoder may determine not to use the RDO method, and then determine the first mode in the k prediction modes as the target prediction mode.

Correspondingly, in the present disclosure, when determining, based on the colour difference parameter and the preset colour difference threshold, whether to use the RDO method, if the colour difference parameter is greater than or equal to the preset colour difference threshold, the encoder may determine to use the RDO method, and then determine the target prediction mode from the k prediction modes based on the RDO method.

It should be noted that in the embodiments of the present disclosure, when determining the colour difference parameter of the n target neighbouring points, the encoder may calculate colour difference values of the n target neighbouring points based on the attribute information of the n target neighbouring points, and set the colour difference parameter based on the colour difference values.

It can be understood that in the present disclosure, the encoder may calculate a colour difference value for every two neighbouring points in the n target neighbouring points to obtain a plurality of colour difference values. When determining the colour difference parameter based on the colour difference values, the encoder may select one of the plurality of colour difference values as the colour difference parameter.

For example, in the embodiments of the present disclosure, when setting the colour difference parameter based on the colour difference values, the encoder may set the colour difference parameter to a maximum difference value in the plurality of colour difference values, a minimum difference value in the plurality of colour difference values, or an average of the plurality of colour difference values. This is not specifically limited in the present disclosure.

In summary, the k prediction modes may be classified into three types. A first type is the first mode in the k prediction modes. That is, the attribute information of the current point is predicted based on the weighted average of the geometric information of the n target neighbouring points. A second type is the $m^{th}$ mode in the k prediction modes. That is, the attribute information of the current point is predicted based on the geometric information of the neighbouring point of which the index number is (m−1) in the n target neighbouring points. A third type is the $k^{th}$ mode in the k prediction modes. That is, the attribute information of the current point is predicted based on the geometric information and the attribute information of the n target neighbouring points.

Further, in the embodiments of the present disclosure, after determining the target prediction mode from the k prediction modes, the encoder may set a mode parameter based on the target prediction mode, and then the mode parameter may be signalled into a bitstream. The mode parameter is used to determine the target prediction mode. Specifically, the encoder may assign a value to the mode parameter. Different values represent different prediction modes.

For example, 5 target neighbouring points of the current point are determined to be a first neighbouring point, a second neighbouring point, a third neighbouring point, a fourth neighbouring point, and a fifth neighbouring point in an ascending order of Euclidean distances. A Euclidean distance between the first neighbouring point and the current point is the shortest. A Euclidean distance between the fifth neighbouring point and the current point is the longest. 7 different prediction modes may be set based on the 5 target neighbouring points. Specifically, a first mode indicates that the predicted value of the attribute information of the current point is determined based on a weighted average of geometric information of the 5 target neighbouring points. A second mode to a sixth mode indicate that the predicted value of the attribute information of the current point is determined based on attribute information of one of the 5 target neighbouring points. For example, the second mode indicates that the predicted value is determined based on attribute information of the first neighbouring point, and the fifth mode indicates that the predicted value is determined based on attribute information of the fourth neighbouring point. A seventh mode indicates that the predicted value of the attribute information of the current point is determined based on the geometric information and attribute information of the 5 target neighbouring points. After determining the target prediction mode from the 7 prediction modes, the encoder may set corresponding mode parameters. For example, the mode parameters corresponding to the second mode to the sixth mode may be set to 1, 2, 3, 4, and 5, respectively, and the mode parameter corresponding to the seventh mode may be set to 6.

In 103, the predicted value of the attribute information of the current point is determined based on the target prediction mode and the attribute information of the n target neighbouring points.

In the embodiments of the present disclosure, after determining the target prediction mode from the k prediction modes based on the geometric information of the n target neighbouring points, the encoder may use the target prediction mode to predict the attribute information of the current point, that is, determine the predicted value of the attribute information of the current point based on the target prediction mode and the attribute information of the n target neighbouring points.

Further, in the embodiments of the present disclosure, the k prediction modes may be classified into the three types. The first type is the first mode in the k prediction modes. That is, the attribute information of the current point is predicted based on the weighted average of the geometric information of the n target neighbouring points. The second type is the $m^{th}$ mode in the k prediction modes. That is, the attribute information of the current point is predicted based on the geometric information of the neighbouring point of which the index number is (m−1) in the n target neighbouring points. The third type is the $k^{th}$ mode in the k prediction modes. That is, the attribute information of the current point is predicted based on the geometric information and the attribute information of the n target neighbouring points.

It should be noted that in the embodiments of the present disclosure, for the first type, that is, if the target prediction mode is the first mode, when determining the predicted value of the attribute information of the current point based on the target prediction mode and the attribute information of the n target neighbouring points, the encoder may determine n distance parameters corresponding to the n target neighbouring points respectively, and perform weighted averaging based on the n distance parameters and the attribute information of the n target neighbouring points to obtain the predicted value of the attribute information of the current point.

Specifically, in the present disclosure, when performing the weighted averaging based on the n distance parameters and the attribute information of the n target neighbouring points to obtain the predicted value of the attribute information of the current point, the encoder may use reciprocals of the n distance parameters as n weight values corresponding to the n target neighbouring points, and perform weighted averaging on the attribute information of the n target neighbouring points to obtain the predicted value of the attribute information of the current point. It can be learned that a neighbouring point closer to the current point corresponds to a larger weight value, and attribute information of the neighbouring point has a greater impact on a prediction result.

It should be noted that in the embodiments of the present disclosure, for the second type, that is, if the target prediction mode is the $m^{th}$ mode, when determining the predicted value of the attribute information of the current point based on the target prediction mode and the attribute information of the n target neighbouring points, the encoder may determine the attribute information of the neighbouring point of which the index number is (m−1) in the n target neighbouring points as the predicted value of the attribute information of the current point.

It should be noted that in the present disclosure, when the $m^{th}$ mode is used to predict the attribute information of the current point, the attribute information of the $(m−1)^{th}$ neighbouring point in the n target neighbouring points may be used as the predicted value. For example, for the 5 target neighbouring points of the current point, if the third mode is used, the encoder may determine the attribute information of the second neighbouring point in the 5 target neighbouring points as the predicted value of the attribute information of the current point.

It should be noted that in the embodiments of the present disclosure, for the third type, that is, if the target prediction mode is the $k^{th}$ mode, when determining the predicted value of the attribute information of the current point based on the target prediction mode and the attribute information of the n target neighbouring points, the encoder may determine a model parameter of a prediction model based on the geometric information and the attribute information of the n target neighbouring points, and then determine the predicted value of the attribute information of the current point through the prediction model based on the model parameter and the geometric information of the current point.

Further, in the embodiments of the present disclosure, when predicting the attribute information of the current point based on the geometric information and the attribute information of the n target neighbouring points, the encoder may determine, based on the geometric information and an attribute component in the attribute information of the n target neighbouring points, a model parameter corresponding to the attribute component, and then determine a predicted value of the attribute component in the attribute information of the current point through the prediction model based on the model parameter and the geometric information of the current point. The attribute component is any component in the attribute information.

For example, in the embodiments of the present disclosure, if the attribute information is the attribute value of the RGB space, the attribute component may be any one of an R component, a G component, or a B component. If the attribute information is the attribute value of the YUV space, the attribute component may be any one of a Y component, a U component, or a V component. If the attribute information is the attribute value of the YCbCr space, the attribute component may be any one of a Y component, a Cb component, or a Cr component. This is not specifically limited in the present disclosure.

It can be understood that in the embodiment of the present disclosure, when predicting the attribute information of the current point based on the geometric information and the attribute information of the n target neighbouring points, the encoder may further determine the predicted value of the attribute information of the current point based on predicted values of all components in the attribute information of the current point. Specifically, the encoder may determine a model parameter for each component in the attribute information, and predict the attribute information of the current point through the prediction model based on the model parameter corresponding to the component, to determine a predicted value of the component in the attribute information of the current point. All model parameters corresponding to all components in the attribute information are sequentially determined through the foregoing method, and the predicted values of all components in the attribute information of the current point are determined through the prediction model based on all model parameters, to predict the attribute information of the current point.

Further, in the embodiments of the present disclosure, after determining the predicted value of the attribute component in the attribute information of the current point through the prediction model, the encoder may further limit and restrict the predicted value of the attribute component based on a preset component range. Specifically, in the present disclosure, if the predicted value of the attribute component is beyond the preset component range, the encoder may set the predicted value of the attribute component in the attribute information of the current point based on the preset component range.

It should be noted that in the embodiments of the present disclosure, the preset component range may include an upper threshold and a lower threshold. Correspondingly, if the predicted value of the attribute component is less than the lower threshold, the encoder may set the predicted value of the attribute component in the attribute information of the current point to the lower threshold. If the predicted value of the attribute component is greater than the upper threshold, the encoder may set the predicted value of the attribute component in the attribute information of the current point to the upper threshold.

Optionally, in the present disclosure, if the predicted value of the attribute component is greater than the upper threshold, or if the predicted value of the attribute component is beyond a preset colour space value range, for example, the predicted value of the attribute component is beyond an RGB space value range, the encoder may set the predicted value of the attribute component in the attribute information of the current point to an attribute component of the first neighbouring point in the n target neighbouring points.

In other words, in the embodiments of the present disclosure, the encoder may limit the predicted value of the attribute component in the attribute information of the current point by setting the preset component range. That is, the predicted value of the attribute component needs to fall within the range of the lower threshold to the upper threshold.

Further, in the embodiments of the present disclosure, when setting the preset component range, the encoder may set the upper threshold based on a bit depth corresponding to the predicted value of the attribute component, and set the lower threshold to a constant greater than or equal to 0.

It should be noted that in the embodiments of the present disclosure, a bit depth of a component is used to represent a number of bits used to represent sampling data of the component.

For example, if the bit depth corresponding to the predicted value of the attribute component is bitdepth, the encoder may set the preset component range to 0 to (1<<bit-depth)−1. In other words, the lower threshold of the preset component range is 0, and the upper threshold of the preset component range is (1<<bitdepth)−1.

Optionally, in the embodiments of the present disclosure, when predicting the attribute information of the current point, the encoder may set the predicted value of the attribute component in the attribute information of the current point to an attribute component in attribute information of the first neighbouring point in the n target neighbouring points. In other words, the encoder may select attribute information of a neighbouring point closest to the current point to set the predicted value of the attribute component of the current point.

Optionally, in the embodiments of the present disclosure, when predicting the attribute information of the current point, the encoder may set the predicted value of the attribute component to the upper threshold in the preset component range. In other words, the encoder may set the predicted value of the attribute component of the current point based on a preset component threshold.

It can be learned that in the embodiment of the present disclosure, after determining the target prediction mode from the k prediction modes, the encoder may select different prediction modes to predict the attribute information of the current point for different target prediction modes, to obtain the predicted value of the attribute information of the current point.

In 104, the current point is encoded based on the predicted value.

In the embodiment of the present disclosure, after determining the predicted value of the attribute information of the current point based on the target prediction mode and the attribute information of the n target neighbouring points, the encoder may encode the current point based on the predicted value of the attribute information of the current point.

It should be noted that in the embodiments of the present disclosure, the predicted value corresponding to the current point may be used to determine a residual corresponding to the current point. Specifically, the encoder may further calculate a residual of the attribute information of the current point based on an attribute value of the current point and the predicted value of the attribute information of the current point, and the residual of the attribute information is signalled into the bitstream, to complete encoding of the attribute information of the current point.

In summary, in the point cloud encoding method provided in the present disclosure, when the attribute information of the neighbouring points is used to predict the attribute information of the current point, geometric information of one or more neighbouring points of the current point may be applied to a process of predicting the attribute information, to improve prediction accuracy.

Specifically, in comparison with the prior art, in the point cloud encoding method provided in the present disclosure, a prediction mode is added when predicting the attribute information of the current point. In the added prediction mode, the predicted value of the attribute information of the current point may be determined by using the geometric information and the attribute information of the neighbouring points of the current point.

For example, in the present disclosure, if the encoder determines a predicted value of colour information of the current point by using colour information of 3 neighbouring points of the current point, the target prediction mode may be determined from 5 prediction modes. The 5 prediction modes may be as follows: In a prediction mode 0, namely, predMode=0 (0 is assigned to predMode), weighted averaging is performed on the colour information of the 3 neighbouring points in a neighbouring point set with a reciprocal of a Euclidean distance between the neighbouring point and the current point as a weight, to obtain the predicted value of the colour information of the current point. In a prediction mode 1, namely, predMode=1 (1 is assigned to predMode), colour information of a first neighbouring point ($1^{st}$ nearest point) is used as the predicted value. In a prediction mode 2, namely, predMode=2 (2 is assigned to predMode), colour information of a second neighbouring point ($2^{nd}$ nearest point) is used as the predicted value. In a prediction mode 3, namely, predMode=3 (3 is assigned to predMode), colour information of a third neighbouring point ($3^{rd}$ nearest point) is used as the predicted value. In a prediction mode 4, namely, predMode=4 (4 is assigned to predMode), the predicted value is determined based on the colour information and geometric information of the 3 neighbouring points.

Compared with Table 1, in the embodiments of the present disclosure, Table 2 shows prediction modes and a number of bits idxBits required for encoding in each prediction mode.

TABLE 2

| Prediction mode | Predicted value | idxBits |
| --- | --- | --- |
| 0 | average | 1 |
| 1 | $1^{st}$ nearest point | 2 |
| 2 | $2^{nd}$ nearest point | 3 |
| 3 | $3^{rd}$ nearest point | 3 |
| 4 | position pred value | 4 |

It can be understood that in the embodiments of the present disclosure, for the n target neighbouring points corresponding to the current point and the k prediction modes, types of all prediction modes may include the following three types.

First type: a first mode of which the index number is 0, in which a weighted average is used for prediction.

Second type: modes of which the index numbers are 1, . . . , m, . . . , and n, in which a colour value of a neighbouring point of which the index number is m−1 is used.

Third type: a mode of which the index number is n+1, namely, a mode for predicting a colour value in a linear mode. The linear mode is related to geometric information and attribute information.

It can be learned that in the point cloud encoding method provided in the present disclosure, a mode for predicting colour information of a current point by using geometric information of neighbouring points is added to the existing colour prediction technology. In contrast, the colour prediction technology provided in the present disclosure can make full use of colour information and the geometric information of neighbouring points and improve peak signal-to-noise ratio (PSNR) performance of the encoder and a size of a colour bitstream to some extent. FIG. 6 is a first schematic diagram of prediction performance. FIG. 7 is a second schematic diagram of prediction performance. As shown in FIG. 6 and FIG. 7, by comparison, after the point cloud encoding method provided in the present disclosure is implemented on G-PCC reference software TMC13 V9.1, some of test sequences required by Moving Picture Experts Group (MPEG) are tested under a CTC CY (lossless geometry, near-lossless attribute) test condition. It can be learned that the encoding method provided in the present disclosure can improve the encoding performance to some extent by adding the prediction mode.

The embodiments of the present disclosure disclose point cloud encoding and decoding methods. An encoder determines n target neighbouring points of a current point, where each of the current point and the n target neighbouring points have geometric information and attribute information, and n is a positive integer; the encoder determines a target prediction mode from k prediction modes based on the geometric information of the n target neighbouring points, where k is a positive integer; the encoder determines a predicted value of the attribute information of the current point based on the target prediction mode and the attribute information of the n target neighbouring points; and encodes the current point based on the predicted value. In other words, in the point cloud encoding and decoding methods provided in the present disclosure, a new prediction mode for predicting attribute information of a current point by using geometric information of neighbouring points is added. This can make full use of attribute information and the geometric information of the neighbouring points when predicting the attribute information of the current point, to improve the prediction accuracy and greatly improve the encoding and decoding efficiency.

Based on the foregoing embodiments, in the embodiments of the present disclosure, if the new prediction mode proposed in the present disclosure is used, that is, if the target prediction mode is a $k^{th}$ mode, when determining the predicted value of the attribute information of the current point based on the target prediction mode and the attribute information of the n target neighbouring points, the encoder may determine a model parameter of a prediction model based on the geometric information and the attribute information of the n target neighbouring points, and then determine the predicted value of the attribute information of the current point through the prediction model based on the model parameter and the geometric information of the current point.

Specifically, in the embodiments of the present disclosure, the encoder may determine, based on the geometric information and an attribute component in the attribute information of the n target neighbouring points, a model parameter corresponding to the attribute component, and then determine a predicted value of the attribute component in the attribute information of the current point through the prediction model based on the model parameter and the geometric information of the current point.

For example, in the present disclosure, if the attribute information is an attribute value of a RGB space, the attribute component may be any one of an R component, a G component, or a B component. If the attribute information is an attribute value of a YUV space, the attribute component may be any one of a Y component, a U component, or a V component. If the attribute information is an attribute value of a YCbCr space, the attribute component may be any one of a Y component, a Cb component, or a Cr component. This is not specifically limited in the present disclosure.

It should be noted that in the embodiments of the present disclosure, if the attribute information is colour information, because the attribute information includes at most three types of colour components, for example, RGB or YCbCr, and the geometric information includes at most three types of position coordinates, for example, three coordinate axes XYZ, it may be considered that the $k^{th}$ mode is a linear function representing a colour component as a position coordinate.

The $k^{th}$ mode is described below by using an example in which the attribute information is the attribute value of the RGB space and n is 3. The encoder may determine 3 target neighbouring points corresponding to the current point. 3 pieces of geometric information corresponding to the 3 target neighbouring points may be P1(x1, y1, z1), P2(x2, y2, z2), and P3(x3, y3, z3) respectively.

For example, in the present disclosure, if 3 pieces of attribute information corresponding to the 3 target neighbouring points of the current point are attribute values of the RGB space, the 3 pieces of attribute information may be C1(R1, G1, B1), C2(R2, G2, B2), and C3(R3, G3, B3) respectively.

It is assumed that the colour component may be represented by a linear combination of geometric information. Because geometric positions and colour information of the neighbouring points are relatively close, a red component in the colour information of the 3 neighbouring points may be expressed by using the following formula.

$$
\begin{cases}
R1 = a1x1 + a2y1 + a3z1 \\
R2 = a1x2 + a2y2 + a3z2 \\
R3 = a1x3 + a2y3 + a3z3
\end{cases}
\tag{2}
$$

Values of coefficients a1, a2, and a3 may be obtained by solving a ternary linear equation set, for example, formula (2). That is, model parameters a1, a2, and a3 corresponding to the attribute component are determined based on the geometric information and the attribute component in the attribute information of the 3 target neighbouring points. Further, the predicted value of the red component in the colour information of the current point may be expressed by using the following formula.

$$
\hat{R}=a1x+a2y+a3z
\tag{3}
$$

The geometric information of the current point is denoted as P(x, y, z). The predicted value $\hat{R}$ of the attribute component in the attribute information of the current point may be further determined based on the model parameters and the geometric information of the current point.

Further, in the embodiments of the present disclosure, after determining the predicted value of the attribute component in the attribute information of the current point through the prediction model, the encoder may further limit and restrict the predicted value of the attribute component based on a preset component range. Specifically, in the present disclosure, if the predicted value of the attribute component is beyond the preset component range, the encoder may set the predicted value of the attribute component in the attribute information of the current point based on the preset component range.

For example, in the present disclosure, if the preset component range of the RGB space is 0 to M, the predicted value $\hat{R}$ of the attribute component in the attribute information of the current point may be limited by using the following formula.

$$\begin{cases} \hat{R} > M, \hat{R} = M \\ \hat{R} < 0, \hat{R} = 0 \end{cases} \quad (4)$$

0 is a lower threshold in the preset component range. M is an upper threshold in the preset component range. M may be set based on a bit depth bitdepth corresponding to the predicted value of the attribute component. Specifically, M is (1<<bitdepth)−1.

In other words, in the present disclosure, if the predicted value of the attribute component is less than the lower threshold, the encoder may set the predicted value of the attribute component in the attribute information of the current point to the lower threshold. If the predicted value of the attribute component is greater than the upper threshold, the encoder may set the predicted value of the attribute component in the attribute information of the current point to the upper threshold.

In other words, in the embodiments of the present disclosure, the encoder may limit the predicted value of the attribute component in the attribute information of the current point by setting the preset component range. That is, the predicted value of the attribute component needs to fall within the range of the lower threshold to the upper threshold.

Optionally, in the present disclosure, if the predicted value of the attribute component is greater than the upper threshold, or if the predicted value of the attribute component is beyond a preset colour space value range, for example, the predicted value of the attribute component is beyond an RGB space value range, the encoder may set the predicted value of the attribute component in the attribute information of the current point to an attribute component of the first neighbouring point in the n target neighbouring points.

Further, in the embodiments of the present disclosure, if the ternary linear equation set in formula (2) has no solution, the predicted value $\hat{R}$ of the attribute component in the attribute information of the current point may be determined based on the bit depth bitdepth corresponding to the predicted value of the attribute component. For example, the decoder sets the predicted value of the attribute component to the upper threshold M in the preset component range. In other words, the encoder may set the predicted value of the attribute component of the current point based on a preset component threshold.

Further, in the embodiments of the present disclosure, if the ternary linear equation set in formula (2) has no solution, the predicted value of the attribute component in the attribute information of the current point may be set to an attribute component in attribute information of the first neighbouring point in the n target neighbouring points. In other words, the encoder may select attribute information of a neighbouring point closest to the current point to set the predicted value of the attribute component of the current point.

It can be understood that the encoder can determine the predicted value of the attribute component in the attribute information of the current point through the mode for predicting the colour information of the current point based on the geometric information of the neighbouring points. The foregoing method may also be applied to the other colour components G and B in the RGB space, to obtain the colour information C(R, G, B) predicted by using the geometric information, namely, the predicted value attrPred of the colour information in a geometry prediction mode. Further, the foregoing method may also be applied to the YUV space or the YCbCr space.

In the embodiments of the present disclosure, further, FIG. 8 is a second schematic implementation flowchart of point cloud encoding. As shown in FIG. 8, after the n target neighbouring points of the current point are determined, that is, after 101, the method for encoding the point cloud by the encoder may further include the following operations.

In 105, the target prediction mode is determined from (k−1) prediction modes based on the geometric information of the n target neighbouring points.

In the embodiments of the present disclosure, after determining the n target neighbouring points of the current point, the encoder may further determine the target prediction mode from the (k−1) prediction modes based on the geometric information of the n target neighbouring points.

It can be understood that in the present disclosure, the (k−1) prediction modes are used to predict the attribute information of the current point by using the n pieces of attribute information and the n pieces of geometric information of the n target neighbouring points.

It should be noted that in the embodiments of the present disclosure, k is a positive integer. That is, the encoder may determine the target prediction mode from one or more prediction modes based on the geometric information of the n target neighbouring points.

Further, in the embodiments of the present disclosure, (k−1) prediction modes may be determined based on the geometric information of the n target neighbouring points. A first mode in the (k−1) prediction modes indicates that the predicted value of the attribute information of the current point is determined based on the weighted average of the geometric information of the n target neighbouring points. Specifically, the first mode in the (k−1) prediction modes may be used to predict the attribute information of the current point by using the weighted average of the n pieces of geometric information of the n target neighbouring points. An $m^{th}$ mode in the (k−1) prediction modes indicates that the predicted value of the attribute information of the current point is determined based on the attribute information of the neighbouring point of which the index number is (m−1) in the n target neighbouring points. Specifically, the $m^{th}$ mode in the (k−1) prediction modes may be used to predict the attribute information of the current point by using geometric information of an $(m-1)^{th}$ neighbouring point in the n target neighbouring points. A $(k-1)^{th}$ mode in the $(k-1)$ prediction modes indicates that the predicted value of the attribute information of the current point is determined based on the geometric information and the attribute information of the n target neighbouring points. The $(k-1)^{th}$ mode in the $(k-1)$ prediction modes indicates that the predicted value of the attribute information of the current point is determined based on the geometric information and the attribute information of the n target neighbouring points. Specifically, the $(k-1)^{th}$ mode in the $(k-1)$ prediction modes is used to predict the attribute information of the current point by using the n pieces of geometric information and the n pieces of attribute information of the n target neighbouring points.

In other words, in the present disclosure, if the encoder determines a predicted value of colour information of the current point by using colour information of 3 neighbouring points of the current point, the target prediction mode may be determined from 4 prediction modes. The 4 prediction modes may be as follows: In a prediction mode 0, namely, predMode=0 (0 is assigned to predMode), weighted averaging is performed on the colour information of the 3 neighbouring point in a neighbouring point set with a reciprocal of a Euclidean distance between the neighbouring point and the current point as a weight, to obtain the predicted value of the colour information of the current point. In a prediction mode 1, namely, predMode=1 (1 is assigned to predMode), colour information of a first neighbouring point ($1^{st}$ nearest point) is used as the predicted value. In a prediction mode 2, namely, predMode=2 (2 is assigned to predMode), colour information of a second neighbouring point ($2^{nd}$ nearest point) is used as the predicted value. In a prediction mode 3, namely, predMode=3 (3 is assigned to predMode), the predicted value is determined based on the colour information and geometric information of the 3 neighbouring points.

Compared with Table 1, in the embodiments of the present disclosure, Table 3 shows prediction modes and a number of bits idxBits required for encoding in each prediction mode.

TABLE 3

| Prediction mode | Predicted value | idxBits |
|---|---|---|
| 0 | average | 1 |
| 1 | $1^{st}$ nearest point | 2 |
| 2 | $2^{nd}$ nearest point | 3 |
| 3 | position pred value | 4 |

In other words, in the present disclosure, the original prediction mode 3 in Table 1 may be replaced by the new prediction mode provided in the present disclosure. That is, colour information of a third neighbouring point ($3^{rd}$ nearest point) is no longer used as the predicted value.

It can be understood that in the embodiments of the present disclosure, the new prediction mode provided in the present disclosure may also be used to replace another prediction mode in Table 1, for example, the original prediction mode 1 or 2 in Table 1. This is not specifically limited in the present disclosure.

Further, in the embodiments of the present disclosure, in addition to replacing any one of the prediction modes in Table 1 with the new prediction mode provided in the present disclosure, the new prediction mode provided in the present disclosure and any one of the prediction modes in Table 1 may be exchanged in order.

For example, in the present disclosure, an $i^{th}$ mode in the k prediction modes indicates that the predicted value of the attribute information of the current point is determined based on the geometric information and the attribute information of the n target neighbouring points, where i is an integer greater than 1 and less than or equal to m. The $k^{th}$ mode in the k prediction modes indicates that the predicted value of the attribute information of the current point is determined based on geometric information of a neighbouring point of which the index number is $(i-1)$ in the n target neighbouring points.

For example, if the encoder determines a predicted value of colour information of the current point by using colour information of 3 neighbouring points of the current point, the target prediction mode may be determined from 4 prediction modes. The 4 prediction modes may include the follows. In a prediction mode 0, namely, predMode=0 (0 is assigned to predMode), weighted averaging is performed on the colour information of the 3 neighbouring point in a neighbouring point set with a reciprocal of a Euclidean distance between a neighbouring point and the current point as a weight, to obtain the predicted value of the colour information of the current point. In a prediction mode 1, namely, predMode=1 (1 is assigned to predMode), colour information of a first neighbouring point ($1^{st}$ nearest point) is used as the predicted value. In a prediction mode 2, namely, predMode=2 (2 is assigned to predMode), colour information of a second neighbouring point ($2^{nd}$ nearest point) is used as the predicted value. In a prediction mode 3, namely, predMode=3 (3 is assigned to predMode), the predicted value is determined based on the colour information and geometric information of the 3 neighbouring points. In a prediction mode 4, namely, predMode=4 (4 is assigned to predMode), colour information of a third neighbouring point ($3^{rd}$ nearest point) is used as the predicted value.

Compared with Table 1, in the embodiments of the present disclosure, Table 4 shows prediction modes and a number of bits idxBits required for encoding in each prediction mode.

TABLE 4

| Prediction mode | Predicted value | idxBits |
|---|---|---|
| 0 | average | 1 |
| 1 | $1^{st}$ nearest point | 2 |
| 2 | $2^{nd}$ nearest point | 3 |
| 3 | position pred value | 3 |
| 4 | $3^{rd}$ nearest point | 4 |

It can be understood that in the present disclosure, after the encoder calculates predicted values of the colour information in the k prediction modes, the encoder may perform RDO selection from the k prediction modes by using an RDO technology, to select an optimal prediction mode to predict the attribute information of the current point, and then may perform entropy encoding on the optimal prediction mode through an arithmetic encoder.

Further, in the embodiments of the present disclosure, when determining the target prediction mode, the encoder may not only directly select the target prediction mode through the RDO method, but also determine whether to use the RDO method before using the RDO method.

In other words, in the embodiments of the present disclosure, the encoder may determine whether to use the RDO method, and then select, based on the determination result, a manner of determining the target prediction mode.

For example, in the present disclosure, the encoder may determine a colour difference parameter of the n target neighbouring points, where the colour difference parameter is used to select a prediction mode; and then determine, based on the colour difference parameter and a preset colour difference threshold, whether to use the RDO method. Specifically, if the colour difference parameter is less than the preset colour difference threshold, the encoder may determine not to use the RDO method, and then determine the first mode in the k prediction modes as the target prediction mode.

Accordingly, in the present disclosure, when determining, based on the colour difference parameter and the preset colour difference threshold, whether to use the RDO method, if the colour difference parameter is greater than or equal to the preset colour difference threshold, the encoder may determine to use the RDO method, and then determine the target prediction mode from the k prediction modes based on the RDO method.

It should be noted that in the embodiments of the present disclosure, when determining the colour difference parameter of the n target neighbouring points, the encoder may calculate colour difference values of the n target neighbouring points based on the attribute information of the n target neighbouring points, and set the colour difference parameter based on the colour difference values.

It can be understood that in the present disclosure, the encoder may calculate a colour difference value for every two neighbouring points in the n target neighbouring points to obtain a plurality of colour difference values. When determining the colour difference parameter based on the colour difference values, the encoder may select one of the plurality of colour difference values as the colour difference parameter.

For example, in the embodiments of the present disclosure, when setting the colour difference parameter based on the colour difference values, the encoder may set the colour difference parameter to a maximum difference value in the plurality of colour difference values, a minimum difference value in the plurality of colour difference values, or an average of the plurality of colour difference values. This is not specifically limited in the present disclosure.

For example, the encoder may calculate the colour difference values of the n target neighbouring points of the current point, determine the maximum difference value maxDiff in the colour difference values, and compare maxDiff whick is taken as the colour difference parameter with the preset colour difference threshold. If the colour difference parameter is less than the preset colour difference threshold, the encoder selects not to use the RDO method, and determines the first mode in the k prediction modes as the target prediction mode, in which a weighted average of colour values of the neighbouring points is used. Otherwise, the encoder may determine to use the RDO method, and then determine the target prediction mode through the RDO method.

Specifically, in the present disclosure, when calculating the maximum colour difference value maxDiff of the n neighbouring points of the current point, a maximum difference value of the neighbouring points in the R component, namely, MAX(R)-MIN(R), may be calculated first. The same applies to the G and B components, and colour spaces other than the RGB space. Then, the maximum difference value in the R, G, and B components is selected as maxDiff, i.e., $$maxDiff=max(max(R1,R2,R3)-min(R1,R2,R3),max$$
$$(G1,G2,G3)-min(G1,G2,G3),max(B1,B2,B3)-$$
$$min(B1,B2,B3)) \qquad (5)$$

maxDiff is compared with the preset colour difference threshold. If maxDiff is less than the preset colour difference threshold, it is determined that the prediction mode of the current point is set to 0, and the first mode is determined as the target prediction mode, that is, predMode=0. If maxDiff is greater than or equal to the preset colour difference threshold, the RDO technology is used to calculate predicted colour values attrPred corresponding to the k prediction modes for the current point. The predicted value attrPred is substracted from a colour value attrValue of the current point, and quantization is performed to obtain a quantization residual attrResidualQuant. Distortion D in the RDO technology is a sum of three components of attrResidualQuant.

$$D=attrResidualQuant[0]+attrResidualQuant[1]+attr-$$
$$ResidualQuant[2] \qquad (6)$$

The number of bits idxBits required for encoding in the prediction mode is used as a bit rate R in the RDO technology, that is, R=idxBits. A cost score of each prediction mode may be expressed as D+lambdaxR, where lambda=0.01xQstep. A prediction mode with a smallest cost score is selected as the optimal prediction mode of the current point.

Further, in the embodiments of the present disclosure, FIG. 9 is a third schematic implementation flowchart of point cloud encoding. As shown in FIG. 9, in the embodiments of the present disclosure, after the n target neighbouring points of the current point are determined, that is, after 101, the method for encoding the point cloud by the encoder may further include the following operations.

In 106, a prediction parameter is determined. The prediction parameter is used to indicate whether to perform mode selection.

In 107, if the prediction parameter indicates not to perform mode selection, the target prediction mode is determined from the k prediction modes.

In 108, if the prediction parameter indicates to perform mode selection, the target prediction mode is determined through an RDO method.

In the embodiments of the present disclosure, after determining the n target neighbouring points of the current point, the encoder may first determine the prediction parameter.

It can be understood that in the embodiments of the present disclosure, the prediction parameter may be used to indicate whether to perform mode selection. That is, the encoder may first determine whether to use one of the k prediction modes to predict the attribute information of the current point.

Further, in the embodiments of the present disclosure, the encoder may determine the prediction parameter to determine whether to use one of the determined k prediction modes as the target prediction mode or determine the target prediction mode through the RDO method.

Specifically, in the embodiments of the present disclosure, if the prediction parameter indicates not to perform mode selection, the encoder may determine the target prediction mode from the k prediction modes based on the prediction parameter. That is, the prediction mode may also be used to indicate the target prediction mode. Accordingly, if the prediction parameter indicates to perform mode selection, the encoder may determine the target prediction mode through the RDO method.

For example, in the embodiments of the present disclosure, through determination of the prediction parameter, the new prediction mode proposed in the present disclosure can be separately used as a prediction technology in parallel with RDO. In other words, a value of a flag bit of the prediction parameter may be set to indicate whether the new prediction mode or the RDO method is to be used for the current point. For example, if the value of the flag bit of the prediction parameter is 0, the $k^{th}$ mode in the k prediction modes is used as the target prediction mode. If the value of the flag bit of the prediction parameter is 1, the encoder determines the target prediction mode from the k prediction modes through the RDO method.

Figure 10:
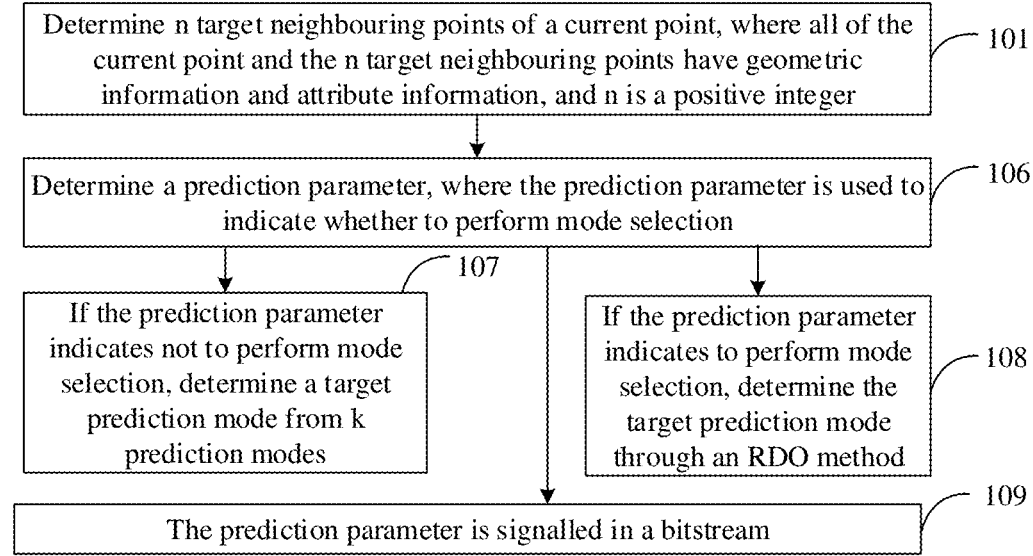
FIG. 10 is a fourth schematic implementation flowchart of point cloud encoding.

Further, in the embodiments of the present disclosure, FIG. 10 is a fourth schematic implementation flowchart of point cloud encoding. As shown in FIG. 10, in the embodiments of the present disclosure, after the prediction parameter is determined, that is, after 106, the method for encoding the point cloud by the encoder may further include the following operation.

In 109, the prediction parameter is signalled into a bitstream.

In the embodiments of the present disclosure, after determining the prediction parameter, the prediction parameter may be signaled into a binary bitstream by the encoder, and the encoder may transmit the binary bitstream to a decoding side, such that a decoder can determine, based on the decoded prediction parameter, whether to perform mode selection.

Figure 11:
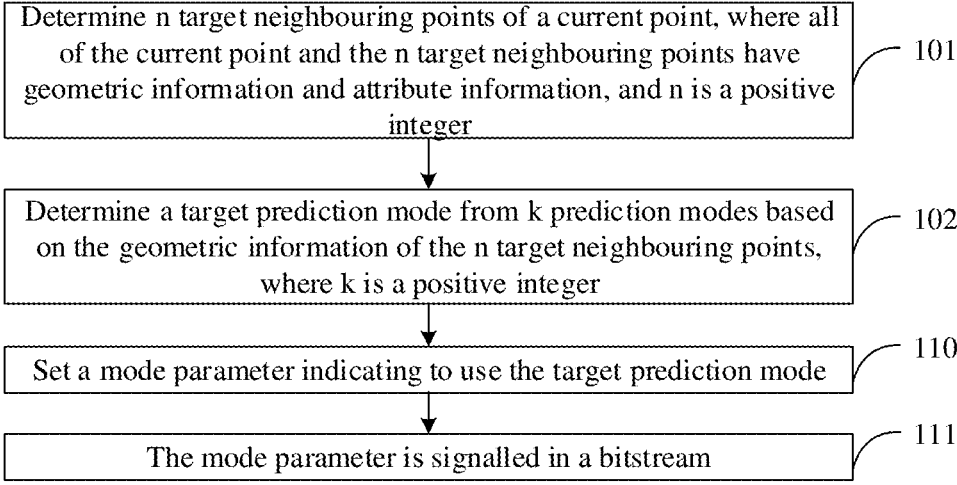
FIG. 11 is a fifth schematic implementation flowchart of point cloud encoding.

Further, in the embodiments of the present disclosure, FIG. 11 is a fifth schematic implementation flowchart of point cloud encoding. As shown in FIG. 11, in the embodiments of the present disclosure, after the target prediction mode is determined from the k prediction modes based on the geometric information of the n target neighbouring points, that is, after 102, the method for encoding the point cloud by the encoder may further include the following operation.

In 110, a mode parameter indicating to use the target prediction mode is set.

In 111, the mode parameter is signalled into a bitstream.

In the embodiments of the present disclosure, after determining the target prediction mode from the k prediction modes, the encoder may set the mode parameter to indicate to use the target prediction mode, signal the mode parameter into a binary bitstream, and transmit the binary bitstream to the decoding side, such that the decoder can determine the target prediction mode based on the decoded mode parameter.

The embodiments of the present disclosure disclose point cloud encoding and decoding methods. An encoder determines n target neighbouring points of a current point, where each of the current point and the n target neighbouring points have geometric information and attribute information, and n is a positive integer; the encoder determines a target prediction mode from k prediction modes based on the geometric information of the n target neighbouring points, where k is a positive integer; the encoder determines a predicted value of the attribute information of the current point based on the target prediction mode and the attribute information of the n target neighbouring points; and the encoder encodes the current point based on the predicted value. In other words, in the point cloud encoding and decoding methods provided in the present disclosure, a new prediction mode for predicting attribute information of a current point by using geometric information of neighbouring points is added. This can make full use of attribute information and the geometric information of the neighbouring points when predicting the attribute information of the current point, to improve the prediction accuracy and greatly improve the encoding and decoding efficiency.

Figure 12:
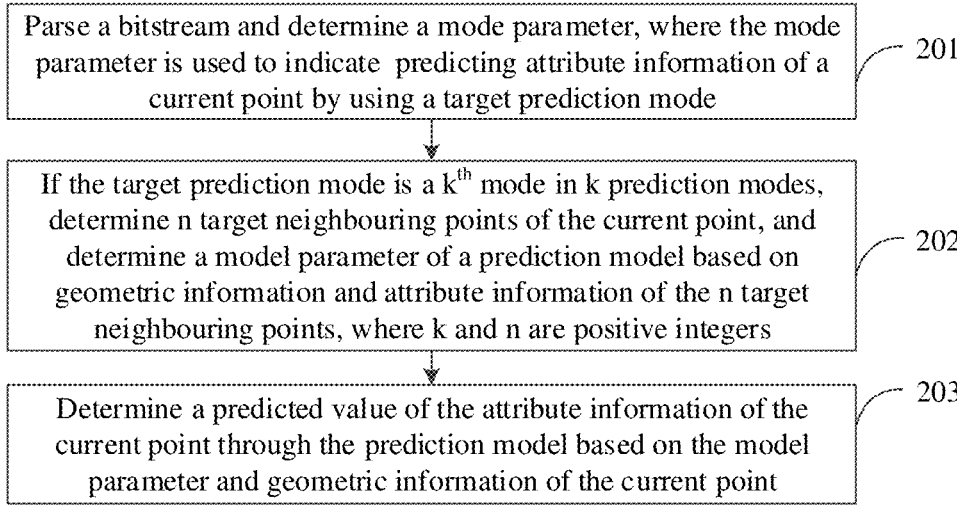
FIG. 12 is a schematic implementation flowchart of point cloud decoding.

An embodiment of the present disclosure provides a point cloud decoding method. FIG. 12 is a schematic implementation flowchart of point cloud decoding. As shown in FIG. 12, in the embodiments of the present disclosure, a method for decoding a point cloud by a decoder may include the following operations.

In 201, a bitstream is parsed, and a mode parameter is determined. The mode parameter is used to indicate to use a target prediction mode to predict attribute information of a current point.

In the embodiments of the present disclosure, the decoder may parse the bitstream and determine the mode parameter. The mode parameter is used to determine the target prediction mode. Specifically, on an encoding side, an encoder may assign a value to the mode parameter. Different values represent different prediction modes.

It should be noted that in the embodiments of the present disclosure, the target prediction mode may be any one of k prediction modes, where k is a positive integer.

In 202, if the target prediction mode is a $k^{th}$ mode in the k prediction modes, n target neighbouring points of the current point are determined, and a model parameter of a prediction model is determined based on geometric information and attribute information of the n target neighbouring points, where k and n are positive integers.

In the embodiments of the present disclosure, after parsing the bitstream and determining the mode parameter, if the target prediction mode indicated by the mode parameter is the $k^{th}$ mode in the k prediction modes, the decoder may determine the n target neighbouring points of the current point, and then determine the model parameter of the prediction model based on the geometric information and the attribute information of the n target neighbouring points.

Further, in the embodiments of the present disclosure, the decoder may first determine the n target neighbouring points in all decoded neighbouring points around the current point, and n pieces of geometric information and n pieces of attribute information corresponding to the n target neighbouring points, where n is a positive integer, that is, n=1, 2, 3, . . . .

It should be noted that in the embodiments of the present disclosure, the decoder may predict the attribute information of the current point by using the geometric information and the attribute information of the n target neighbouring points and the geometric information of the current point.

It can be understood that in the embodiments of the present disclosure, the current point may be a to-be-decoded point in the point cloud. There are a plurality of decoded points around the current point. Specifically, when determining the n target neighbouring points, the decoder may select the n target neighbouring points from all decoded neighbouring points around the current point. In other words, the n target neighbouring points are also decoded points around the current point.

It should be noted that in the embodiments of the present disclosure, when determining the n target neighbouring points of the current point, the decoder determines a plurality of distance parameters between a plurality of decoded points in the point cloud and the current point, and then determines the n target neighbouring points from the plurality of points based on the plurality of distance parameters. The distance parameters may represent distances between the current point and other points in the point cloud.

In other words, in the embodiments of the present disclosure, when determining the n target neighbouring points of the current point, the decoder may first calculate distance parameters between the current point and all surrounding decoded neighbouring points, and then select the n target neighbouring points from all the decoded neighbouring points based on the distance parameters.

For example, in the embodiments of the present disclosure, after calculating the distance parameters between the current point and all decoded neighbouring points, the decoder may determine n decoded neighbouring points corresponding to n smallest distance parameters as the n target neighbouring points. For example, distance parameters between the current point and 8 surrounding decoded neighbouring points A1, A2, A3, A4, A5, A6, A7, and A8 are a1, a2, a3, a4, a5, a6, a7, and a8, respectively. If a1<a2<a3<a4<a5<a6<a7<a8, the decoder may determine the neighbouring points A1, A2, A3, and A4 as 4 target neighbouring points of the current point.

In other words, in the present disclosure, when determining the n target neighbouring points of the current point, the decoder may determine distance parameters between the current point and one or more candidate neighbouring points in the point cloud, and then determine the n target neighbouring points based on the distance parameters. The distance parameter indicates a distance between two points in the point cloud.

It can be understood that in the embodiments of the present disclosure, the distance parameter between the current point and each decoded neighbouring point calculated by the decoder may be a Euclidean distance, a cosine distance, or the like between the two points. This is not specifically limited in the present disclosure. For example, in the present disclosure, the distance parameter indicates a Euclidean distance between two points in the point cloud.

It should be noted that in the embodiments of the present disclosure, when determining the n target neighbouring points of the current point, the decoder may further sort the n neighbouring points, and sequentially determine a first neighbouring point to an $n^{th}$ neighbouring point. Specifically, the decoder may sequentially determine the first neighbouring point to the $n^{th}$ neighbouring point from a plurality of points in the point cloud in an ascending order of distance parameters.

For example, in the present disclosure, the distance parameters between the current point and the 8 surrounding decoded neighbouring points A1, A2, A3, A4, A5, A6, A7, and A8 are a1, a2, a3, a4, a5, a6, a7, and a8, respectively. If a1<a2<a3<a4<a5<a6<a7<a8, the decoder may determine the neighbouring point A1 as the first neighbouring point, the neighbouring point A2 as the second neighbouring point, the neighbouring point A3 as the third neighbouring point, and the neighbouring point A4 as the fourth neighbouring point.

In other words, in the present disclosure, the decoder may sequentially determine the first neighbouring point to the $n^{th}$ neighbouring point from the candidate neighbouring points in an ascending order of distances indicated by the distance parameters. The decoder may determine index numbers of the n target neighbouring points in an ascending order of the distance parameters. For example, an index number of the first neighbouring point is 1, and an index number of the $n^{th}$ neighbouring point is n.

Further, in the embodiments of the present disclosure, any one of the n target neighbouring points corresponds to one piece of geometric information and one piece of attribute information. The geometric information represents a spatial position of a neighbouring point, and the attribute information represents a reconstructed attribute value of a neighbouring point.

It should be noted that in the embodiments of the present disclosure, the attribute information may include colour information. Specifically, the attribute information may be an attribute value of any colour space. For example, the attribute information may be an attribute value of an RGB space, an attribute value of a YUV space, or an attribute value of a YCbCr space. This is not specifically limited in the present disclosure.

It can be understood that in the embodiments of the present disclosure, when predicting the attribute information of the current point based on the geometric information and the attribute information of the n target neighbouring points, the decoder may further determine a predicted value of the attribute information of the current point based on predicted values of all components in the attribute information of the current point. Specifically, the decoder may determine a model parameter for each component in the attribute information, and then predict the attribute information of the current point through the prediction model based on the model parameter corresponding to the component, to determine a predicted value of the component in the attribute information of the current point. All model parameters corresponding to all components in the attribute information are determined through the foregoing method, and all components in the attribute information of the current point are determined through the prediction model based on all model parameters, to complete prediction of the attribute information of the current point.

For example, in the present disclosure, the decoder may determine 3 target neighbouring points corresponding to the current point. 3 pieces of geometric information corresponding to the 3 target neighbouring points may be P1(x1, y1, z1), P2(x2, y2, z2), and P3(x3, y3, z3) respectively.

For example, in the present disclosure, if 3 pieces of attribute information corresponding to the 3 target neighbouring points of the current point are attribute values of the RGB space, the 3 pieces of attribute information may be C1(R1, G1, B1), C2(R2, G2, B2), and C3(R3, G3, B3) respectively.

It should be noted that in the embodiments of the present disclosure, the attribute information of the n target neighbouring points may be decoded reconstructed attribute values. The attribute information may be the colour information, reflectivity, or another attribute. This is not limited in the present disclosure.

It can be understood that in the present disclosure, the k prediction modes are used to predict the attribute information of the current point by using the n pieces of attribute information and the n pieces of geometric information of the n target neighbouring points.

It should be noted that in the embodiments of the present disclosure, n and k are positive integers. That is, the decoder may determine the target prediction mode from one or more prediction modes based on the geometric information of the n target neighbouring points.

Further, in the embodiments of the present disclosure, a first mode in the k prediction modes indicates that a predicted value of the attribute information of the current point is determined based on a weighted average of the geometric information of the n target neighbouring points. Specifically, the first mode in the k prediction modes may be used to predict the attribute information of the current point by using the weighted average of the n pieces of geometric information of the n target neighbouring points.

Further, in the embodiments of the present disclosure, an $m^{th}$ mode in the k prediction modes indicates that the predicted value of the attribute information of the current point is determined based on attribute information of a neighbouring point of which the index number is (m−1) in the n target neighbouring points, where m is an integer greater than 1 and less than or equal to (n+1). Specifically, the $m^{th}$ mode in the k prediction modes is used to predict the attribute information of the current point by using geometric information of an $(m-_1)^{th}$ neighbouring point in the n target neighbouring points.

Further, in the embodiments of the present disclosure, a $k^{th}$ mode in the k prediction modes indicates that the predicted value of the attribute information of the current point is determined based on the geometric information and the attribute information of the n target neighbouring points. Specifically, the $k^{th}$ mode in the k prediction modes is used to predict the attribute information of the current point by using the n pieces of geometric information and the n pieces of attribute information of the n target neighbouring points.

In summary, the k prediction modes may be classified into three types. A first type is the first mode in the k prediction modes. That is, the attribute information of the current point is predicted based on the weighted average of the geometric information of the n target neighbouring points. A second type is the $m^{th}$ mode in the k prediction modes. That is, the attribute information of the current point is predicted based on the geometric information of the neighbouring point of which the index number is (m−1) in the n target neighbouring points. A third type is the $k^{th}$ mode in the k prediction modes. That is, the attribute information of the current point is predicted based on the geometric information and the attribute information of the n target neighbouring points.

In 203, the predicted value of the attribute information of the current point is determined through the prediction model based on the model parameter and the geometric information of the current point.

In the embodiments of the present disclosure, after determining the model parameter of the prediction model based on the geometric information and the attribute information of the n target neighbouring points, the decoder may determine the predicted value of the attribute information of the current point through the prediction model based on the model parameter and the geometric information of the current point.

It should be noted that in the embodiments of the present disclosure, if the target prediction mode is the $k^{th}$ mode, the decoder may determine the model parameter of the prediction model based on the geometric information and the attribute information of the n target neighbouring points, and then determine the predicted value of the attribute information of the current point through the prediction model based on the model parameter and the geometric information of the current point.

Specifically, in the embodiments of the present disclosure, the decoder may determine, based on the geometric information and an attribute component in the attribute information of the n target neighbouring points, a model parameter corresponding to the attribute component, and then determine a predicted value of the attribute component in the attribute information of the current point through the prediction model based on the model parameter and the geometric information of the current point.

For example, in the present disclosure, if the attribute information is an attribute value of a RGB space, the attribute component may be any one of an R component, a G component, or a B component. If the attribute information is an attribute value of a YUV space, the attribute component may be any one of a Y component, a U component, or a V component. If the attribute information is an attribute value of a YCbCr space, the attribute component may be any one of a Y component, a Cb component, or a Cr component. This is not specifically limited in the present disclosure.

It should be noted that in the embodiments of the present disclosure, if the attribute information is colour information, because the attribute information includes at most three types of colour components, for example, RGB or YCbCr, and the geometric information includes at most three types of position coordinates, for example, three coordinate axes XYZ, it may be considered that the $k^{th}$ mode is a linear function representing a colour component as a position coordinate.

The following describes the $k^{th}$ mode by using an example in which the attribute information is the attribute value of the RGB space and n is 3. The decoder may determine 3 target neighbouring points corresponding to the current point. 3 pieces of geometric information corresponding to the 3 target neighbouring points may be P1(x1, y1, z1), P2(x2, y2, z2), and P3(x3, y3, z3) respectively.

For example, in the present disclosure, if 3 pieces of attribute information corresponding to the 3 target neighbouring points of the current point are attribute values of the RGB space, the 3 pieces of attribute information may be C1(R1, G1, B1), C2(R2, G2, B2), and C3(R3, G3, B3) respectively.

It is assumed that the colour component may be represented by a linear combination of geometric information. Because geometric positions and colour information of the neighbouring points are relatively close, red components in the colour information of the 3 neighbouring points may be expressed by using formula (2). Values of coefficients a1, a2, and a3 may be obtained by solving a ternary linear equation set, for example, formula (2). That is, model parameters a1, a2, and a3 corresponding to the attribute component are determined based on the geometric information and the attribute component in the attribute information of the 3 target neighbouring points. Further, the predicted value of the red component in the colour information of the current point may be expressed by using formula (3). The geometric information of the current point is denoted as P(x, y, z). The predicted value $\hat{R}$ of the attribute component in the attribute information of the current point may be further determined based on the model parameters and the geometric information of the current point.

Further, in the embodiments of the present disclosure, after determining the predicted value of the attribute component in the attribute information of the current point through the prediction model, the decoder may further limit and restrict the predicted value of the attribute component based on a preset component range. Specifically, in the present disclosure, if the predicted value of the attribute component is beyond the preset component range, the decoder may set the predicted value of the attribute component in the attribute information of the current point based on the preset component range.

For example, in the present disclosure, if the preset component range of the RGB space is 0 to M, the predicted value $\hat{R}$ of the attribute component in the attribute information of the current point may be limited by using formula (4). 0 is a lower threshold in the preset component range. M is an upper threshold in the preset component range. M may be related to a bit depth bitdepth corresponding to the predicted value of the attribute component. Specifically, M is (1<<bitdepth)−1.

In other words, in the present disclosure, if the predicted value of the attribute component is less than the lower threshold, the lower threshold is the predicted value of the attribute component in the attribute information of the current point. If the predicted value of the attribute component is greater than the upper threshold, the decoder may set the predicted value of the attribute component in the attribute information of the current point to the upper threshold.

In other words, in the embodiments of the present disclosure, the decoder may limit the predicted value of the attribute component in the attribute information of the current point by setting the preset component range. That is, the predicted value of the attribute component needs to fall within the range of the lower threshold to the upper threshold.

Optionally, in the present disclosure, if the predicted value of the attribute component is greater than the upper threshold, or if the predicted value of the attribute component is beyond a preset colour space value range, for example, the predicted value of the attribute component is beyond an RGB space value range, the decoder may set the predicted value of the attribute component in the attribute information of the current point to an attribute component of the first neighbouring point in the n target neighbouring points.

Further, in the embodiments of the present disclosure, if the ternary linear equation set in formula (2) has no solution, the predicted value $\hat{R}$ of the attribute component in the attribute information of the current point may be determined based on the bit depth bitdepth corresponding to the predicted value of the attribute component. For example, the upper threshold M in the preset component range may be the predicted value of the attribute component. In other words, the predicted value of the attribute component of the current point may be determined based on a preset component threshold.

Further, in the embodiments of the present disclosure, if the ternary linear equation set in formula (2) has no solution, the predicted value of the attribute component in the attribute information of the current point may be set to an attribute component in attribute information of the first neighbouring point in the n target neighbouring points. In other words, the decoder may select attribute information of a neighbouring point closest to the current point to set the predicted value of the attribute component of the current point.

It can be understood that the decoder can determine the predicted value of the attribute component in the attribute information of the current point through the mode for predicting the colour information of the current point based on the geometric information of the neighbouring points. The foregoing method may also be applied to the other colour components G and B in the RGB space, to obtain the colour information C(R, G, B) predicted by using the geometric information, namely, the predicted value attrPred of the colour information in a geometry prediction mode. Further, the foregoing method may also be applied to the YUV space or the YCbCr space.

It should be noted that in the embodiments of the present disclosure, for the first type, that is, if the target prediction mode indicated by the mode parameter is the first mode in the k prediction modes, when determining the predicted value of the attribute information of the current point based on the target prediction mode and the attribute information of the n target neighbouring points, the decoder may determine n distance parameters corresponding to the n target neighbouring points, and perform weighted averaging based on the n distance parameters and the attribute information of the n target neighbouring points to obtain the predicted value of the attribute information of the current point.

Specifically, in the present disclosure, when performing the weighted averaging based on the n distance parameters and the attribute information of the n target neighbouring points to obtain the predicted value of the attribute information of the current point, the decoder may use reciprocals of the n distance parameters as n weight values corresponding to the n target neighbouring points, and perform weighted averaging on the attribute information of the n target neighbouring points to obtain the predicted value of the attribute information of the current point. It can be learned that a neighbouring point closer to the current point corresponds to a larger weight value, and attribute information of the neighbouring point has greater impact on a prediction result.

It should be noted that in the embodiments of the present disclosure, for the second type, that is, if the target prediction mode indicated by the mode parameter is the $m^{th}$ mode in the k prediction modes, when determining the predicted value of the attribute information of the current point based on the target prediction mode and the attribute information of the n target neighbouring points, the decoder may determine the attribute information of the neighbouring point of which the index number is (m−1) in the n target neighbouring points as the predicted value of the attribute information of the current point.

It should be noted that in the present disclosure, when the $m^{th}$ mode is used to predict the attribute information of the current point, the attribute information of the $(m−1)^{th}$ neighbouring point in the n target neighbouring points may be used as the predicted value. For example, for the 5 target neighbouring points of the current point, if the third mode is used, the decoder may determine the attribute information of the second neighbouring point in the 5 target neighbouring points as the predicted value of the attribute information of the current point.

It can be learned that in the embodiments of the present disclosure, after determining the target prediction mode from the k prediction modes, the decoder may select different prediction modes to predict the attribute information of the current point for different target prediction modes, to obtain the predicted value of the attribute information of the current point.

In summary, in the point cloud decoding method provided in the present disclosure, when the attribute information of the neighbouring points is used to predict the attribute information of the current point, geometric information of one or more neighbouring points of the current point may be applied to a process of predicting the attribute information, to improve prediction accuracy.

Specifically, in comparison with the prior art, in the point cloud decoding method provided in the present disclosure, a prediction mode is added when predicting the attribute information of the current point. In the added prediction mode, the predicted value of the attribute information of the current point may be determined by using the geometric information and the attribute information of the neighbouring points of the current point.

For example, in the present disclosure, if the decoder determines a predicted value of colour information of the current point by using colour information of 3 neighbouring points of the current point, the target prediction mode may be determined from 5 prediction modes. The 5 prediction modes may be as follows: In a prediction mode 0, namely, predMode=0 (0 is assigned to predMode), weighted averaging is performed on the colour information of the 3 neighbouring points in a neighbouring point set with a reciprocal of a Euclidean distance between the neighbouring point and the current point as a weight, to obtain the predicted value of the colour information of the current point. In a prediction mode 1, namely, predMode=1 (1 is assigned to predMode), colour information of a first neighbouring point ($1^{st}$ nearest point) is used as the predicted value. In a prediction mode 2, namely, predMode=2 (2 is assigned to predMode), colour information of a second neighbouring point ($2^{nd}$ nearest point) is used as the predicted value. In a prediction mode 3, namely, predMode=3 (3 is assigned to predMode), colour information of a third neighbouring point ($3^{rd}$ nearest point) is used as the predicted value. In a prediction mode 4, namely, predMode=4 (4 is assigned to predMode), the predicted value is determined based on the colour information and geometric information of the 3 neighbouring points.

Compared with Table 1, in the embodiments of the present disclosure, Table 2 shows prediction modes and a quantity of bits idxBits required to decode each prediction mode.

It can be understood that in the embodiments of the present disclosure, for the n target neighbouring points and the k prediction modes corresponding to the current point, types of all prediction modes may include the following three types.

First type: a first mode whose index number is 0, in which a weighted average is used for prediction.

Second type: modes of which the index numbers are 1, . . . , m, . . . , and n, in which a colour value of a neighbouring point whose index number is m−1 is used.

Third type: a mode of which the index number is n+1, namely, a mode for predicting a colour value through a linear model. The linear model is related to geometric information and attribute information.

Further, in the embodiments of the present disclosure, (k−1) prediction modes may be determined based on the geometric information of the n target neighbouring points. A first mode in the (k−1) prediction modes indicates determining the predicted value of the attribute information of the current point based on the weighted average of the geometric information of the n target neighbouring points. Specifically, the first mode in the (k−1) prediction modes may be used to predict the attribute information of the current point by using the weighted average of the n pieces of geometric information of the n target neighbouring points. An $m^{th}$ mode in the (k−1) prediction modes indicates determining the predicted value of the attribute information of the current point based on the attribute information of the neighbouring point of which the index number is (m−1) in the n target neighbouring points. Specifically, the $m^{th}$ mode in the (k−1) prediction modes may be used to predict the attribute information of the current point by using geometric information of an $(m_{-1})^{th}$ neighbouring point in the n target neighbouring points. A $(k-1)^{th}$ mode in the (k−1) prediction modes indicates that the predicted value of the attribute information of the current point is determined based on the geometric information and the attribute information of the n target neighbouring points. The $(k-1)^{th}$ mode in the (k−1) prediction modes indicates that the predicted value of the attribute information of the current point is determined based on the geometric information and the attribute information of the n target neighbouring points. Specifically, the $(k-1)^{th}$ mode in the (k−1) prediction modes is used to predict the attribute information of the current point by using the n pieces of geometric information and the n pieces of attribute information of the n target neighbouring points.

Further, in the present disclosure, an $i^{th}$ mode in the k prediction modes indicates that the predicted value of the attribute information of the current point is determined based on the geometric information and the attribute information of the n target neighbouring points, where i is an integer greater than 1 and less than or equal to m. The $k^{th}$ mode in the k prediction modes indicates that the predicted value of the attribute information of the current point is determined based on geometric information of a neighbouring point of which the index number is (i−1) in the n target neighbouring points.

The embodiments of the present disclosure disclose point cloud encoding and decoding methods. A decoder parses a bitstream and determines a mode parameter, where the mode parameter is used to indicate predicting attribute information of a current point by using a target prediction mode; if the target prediction mode is a $k^{th}$ mode in k prediction modes, determines n target neighbouring points of the current point, and determines a model parameter of a prediction model based on geometric information and attribute information of the n target neighbouring points, where k and n are positive integers; and determines a predicted value of the attribute information of the current point through the prediction model based on the model parameter and geometric information of the current point. In other words, a new prediction mode for predicting attribute information of a current point by using geometric information of neighbouring points is added in the point cloud encoding and decoding methods provided in the present disclosure. This can make full use of attribute information and the geometric information of the neighbouring points when the attribute information of the current point is predicted, to improve prediction accuracy and greatly improve encoding and decoding efficiency.

Figure 13:
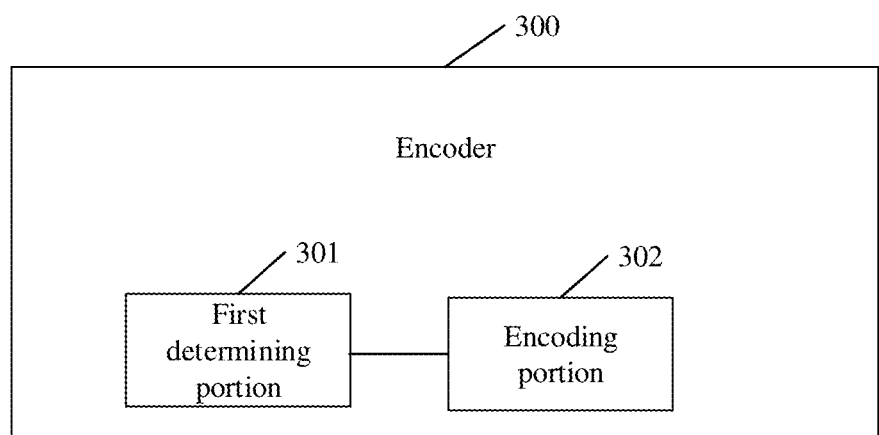
FIG. 13 is a first schematic structural diagram of an encoder.

Based on the foregoing embodiments, in another embodiment of the present disclosure, FIG. 13 is a first schematic structural diagram of an encoder. As shown in FIG. 13, an encoder 300 provided in the embodiments of the present disclosure may include a first determining portion 301 and an encoding portion 302.

The first determining portion 301 is configured to determine n target neighbouring points of a current point, where each of the current point and the n target neighbouring points have geometric information and attribute information, and n is a positive integer; determine a target prediction mode from k prediction modes based on the geometric information of the n target neighbouring points, where k is a positive integer; and determine a predicted value of the attribute information of the current point based on the target prediction mode and the attribute information of the n target neighbouring points.

The encoding portion 302 is configured to encode the current point based on the predicted value.

Figure 14:
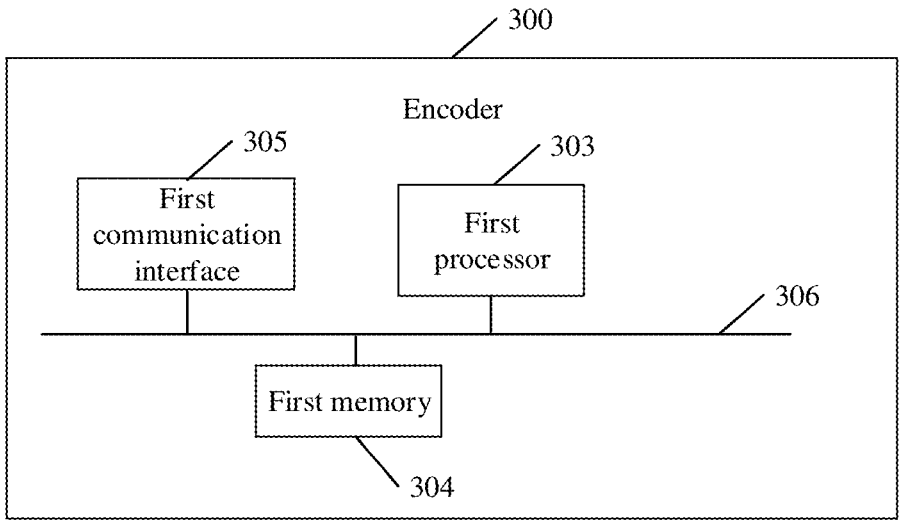
FIG. 14 is a second schematic structural diagram of an encoder.

FIG. 14 is a second schematic structural diagram of an encoder. As shown in FIG. 14, the encoder 300 provided in the embodiments of the present disclosure may include a first processor 303, a first memory 304 storing instructions executable by the first processor 303, a first communication interface 305, and a first bus 306 configured to connect the first processor 303, the first memory 304, and the first communication interface 305.

Further, in the embodiments of the present disclosure, the first processor 303 is configured to determine n target neighbouring points of a current point, where each of the current point and the n target neighbouring points have geometric information and attribute information, and n is a positive integer; determine a target prediction mode from k prediction modes based on the geometric information of the n target neighbouring points, where k is a positive integer; determine a predicted value of the attribute information of the current point based on the target prediction mode and the attribute information of the n target neighbouring points; and encode the current point based on the predicted value.

Figure 15:
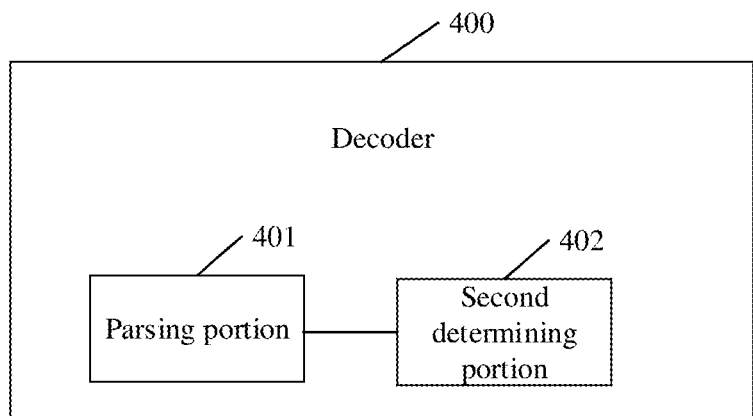
FIG. 15 is a first schematic structural diagram of a decoder.

FIG. 15 is a first schematic structural diagram of a decoder. As shown in FIG. 15, a decoder 400 provided in an embodiment of the present disclosure may include a parsing portion 401 and a second determining portion 402.

The parsing portion 401 is configured to parse a bitstream.

The second determining portion 402 is configured to determine a mode parameter, where the mode parameter is used to indicate predicting attribute information of a current point by using a target prediction mode; if the target prediction mode is a $k^{th}$ mode in k prediction modes, determine n target neighbouring points of the current point, and determine a model parameter of a prediction model based on geometric information and attribute information of the n target neighbouring points, where k and n are positive integers; and determine a predicted value of the attribute information of the current point through the prediction model based on the model parameter and geometric information of the current point.

Figure 16:
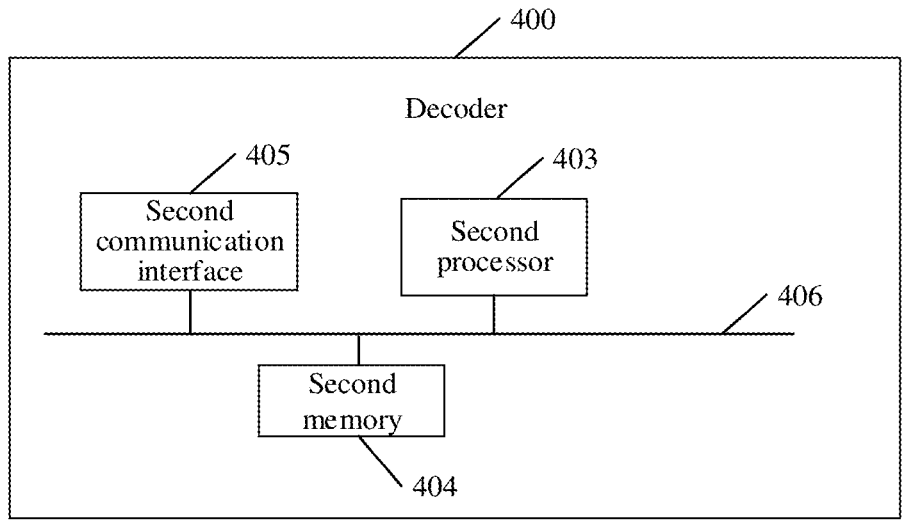
FIG. 16 is a second schematic structural diagram of a decoder.

FIG. 16 is a second schematic structural diagram of a decoder. As shown in FIG. 16, the decoder 400 provided in an embodiment of the present disclosure may alternatively include a second processor 403, a second memory 404 storing instructions executable by the second processor 403, a second communication interface 405, and a second bus 406 configured to connect the second processor 403, the second memory 404, and the second communication interface 405.

Further, in the embodiments of the present disclosure, the second processor 403 is configured to parse a bitstream and determine a mode parameter, where the mode parameter is used to indicate predicting attribute information of a current point by using a target prediction mode; if the target prediction mode is a $k^{th}$ mode in k prediction modes, determine n target neighbouring points of the current point, and determine a model parameter of a prediction model based on geometric information and attribute information of the n target neighbouring points, where k and n are positive integers; and determine a predicted value of the attribute information of the current point through the prediction model based on the model parameter and geometric information of the current point.

If an integrated unit is implemented in the form of a software functional module and is not sold or used as an independent product, the unit may be stored in a computer-readable storage medium. Based on this understanding, the technical solutions in the embodiments, in essence or the part contributing to the prior art, or some or all of the technical solutions may be embodied in the form of a software product. The computer software product is stored in a storage medium, and includes several instructions to cause a computer device (which may be a personal computer, a server, or a network device) or a processor to perform all or some operations of the methods according to the embodiments. The storage medium includes any medium capable of storing program code, such as a USB flash disk, a mobile hard disk, a read-only memory (ROM), a random access memory (RAM), a magnetic disk, or an optical disk.

The embodiments of the present disclosure provide an encoder and a decoder. The encoder determines n target neighbouring points of a current point, where each of the first mode point and the n target neighbouring points have geometric information and attribute information, and n is a positive integer; determines a target prediction mode from k prediction modes based on the geometric information of the n target neighbouring points, where k is a positive integer; determines a predicted value of the attribute information of the current point based on the target prediction mode and the attribute information of the n target neighbouring points; and encodes the current point based on the predicted value. The decoder parses a bitstream and determines a mode parameter, where the mode parameter is used to indicate predicting attribute information of a current point by using a target prediction mode; if the target prediction mode is a $k^{th}$ mode in k prediction modes, determines n target neighbouring points of the current point, and determines a model parameter of a prediction model based on geometric information and attribute information of the n target neighbouring points, where k and n are positive integers; and determines a predicted value of the attribute information of the current point through the prediction model based on the model parameter and geometric information of the current point. In other words, a new prediction mode for predicting attribute information of a current point by using geometric information of neighbouring points is added in the point cloud encoding and decoding methods provided in the present disclosure. This can make full use of attribute information and the geometric information of the neighbouring points when predicting the attribute information of the current point, to improve prediction accuracy and greatly improve encoding and decoding efficiency.

An embodiment of the present disclosure provides a computer-readable storage medium. The computer-readable storage medium stores a program. The program, when executed by a processor, implements the methods in the foregoing embodiments.

Specifically, program instructions corresponding to a point cloud encoding method in the embodiments may be stored in a storage medium, such as an optical disc, a hard disk, or a USB flash disk. When the program instructions corresponding to the point cloud encoding method in the storage medium are read or executed by an electronic device, the following operations are performed.

n target neighbouring points of a current point are determined, where each of the current point and the n target neighbouring points have geometric information and attribute information, and n is a positive integer.

A target prediction mode is determined from k prediction modes based on the geometric information of the n target neighbouring points, where k is a positive integer.

A predicted value of the attribute information of the current point is determined based on the target prediction mode and the attribute information of the n target neighbouring points.

The current point is encoded based on the predicted value.

Specifically, program instructions corresponding to a point cloud decoding method in the embodiments may be stored in a storage medium, such as an optical disc, a hard disk, or a USB flash disk. When the program instructions corresponding to the point cloud decoding method in the storage medium are read or executed by an electronic device, the following operations are performed.

A bitstream is parsed and a mode parameter is determined, where the mode parameter is used to indicate predicting attribute information of a current point by using a target prediction mode.

If the target prediction mode is a $k^{th}$ mode in k prediction modes, n target neighbouring points of the current point are determined, and a model parameter of a prediction model is determined based on geometric information and attribute information of the n target neighbouring points, where k and n are positive integers.

A predicted value of the attribute information of the current point is determined through the prediction model based on the model parameter and geometric information of the current point.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may be in a form of a computer program product that is implemented on one or more computer-usable storage media (including but not limited to a magnetic disk memory, a compact disc ROM (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of other programmable data processing devices to generate a machine such that the instructions executed by a computer or a processor of other programmable data processing devices generate an apparatus for implementing a specific function in one or more processes in the flowcharts and/or in one or more blocks in the block diagrams.

These computer program instructions may be stored in a computer-readable memory that can instruct the computer or other programmable data processing devices to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or other programmable data processing devices such that a series of operations are performed on the computer or other programmable devices, to generate computer-implemented processing. Therefore, the instructions executed on the computer or other programmable devices provide operations for implementing a specific function in one or more processes in the flowcharts and/or in one or more blocks in the block diagrams.

The foregoing description is merely preferred embodiments of the present disclosure, and is not intended to limit the protection scope of the present disclosure.

The embodiments of the present disclosure disclose point cloud encoding and decoding methods, the encoder, the decoder, and the computer storage medium. The encoder determines n target neighbouring points of a current point, where each of the current point and the n target neighbouring points have geometric information and attribute information, and n is a positive integer. The encoder determines a target prediction mode from k prediction modes based on the geometric information of the n target neighbouring points, where k is a positive integer. The encoder determines a predicted value of the attribute information of the current point based on the target prediction mode and the attribute information of the n target neighbouring points; and encodes the current point based on the predicted value. The decoder parses a bitstream and determines a mode parameter, where the mode parameter is used to indicate predicting attribute information of a current point by using a target prediction mode; if the target prediction mode is a $k^{th}$ mode in k prediction modes, determines n target neighbouring points of the current point, and determines a model parameter of a prediction model based on geometric information and attribute information of the n target neighbouring points, where k and n are positive integers. The decoder determines a predicted value of the attribute information of the current point through the prediction model based on the model parameter and geometric information of the current point. In other words, a new prediction mode for predicting attribute information of a current point by using geometric information of neighbouring points is added in the point cloud encoding and decoding methods provided in the present disclosure. This can make full use of attribute information and the geometric information of the neighbouring points when predicting the attribute information of the current point, to improve prediction accuracy and greatly improve encoding and decoding efficiency.

The invention claimed is:

1. A point cloud encoding method, applied to an encoder and the method comprising:

determining n target neighbouring points of a current point, wherein the current point and the n target neighbouring points have geometric information and attribute information, and n is a positive integer;

determining a target prediction mode from k prediction modes based on the geometric information of the n target neighbouring points, wherein k is a positive integer;

determining a predicted value of the attribute information of the current point based on the target prediction mode and the attribute information of the n target neighbouring points; and encoding the current point based on the predicted value;

wherein determining the n target neighbouring points of the current point comprises:

determining distance parameters between the current point and one or more candidate neighbouring points in a point cloud; and determining n candidate neighbouring points corresponding to n smallest distance parameters as the n target neighbouring points from the one or more candidate neighbouring points, wherein the distance parameters indicate a distance between two points in the point cloud.

2. The method of claim 1, wherein a first mode in the k prediction modes indicates determining the predicted value of the attribute information of the current point based on a weighted average of the geometric information of the n target neighbouring points;

an $m^{th}$ mode in the k prediction modes indicates determining the predicted value of the attribute information of the current point based on attribute information of a neighbouring point of which an index number is (m−1) in the n target neighbouring points, wherein m is an integer greater than 1 and less than or equal to (n+1); and a $k^{th}$ mode in the k prediction modes indicates determining the predicted value of the attribute information of the current point based on the geometric information and the attribute information of the n target neighbouring points.

3. The method of claim 1, wherein determining the target prediction mode from the k prediction modes based on the geometric information of the n target neighbouring points comprises:

determining k cost values corresponding to the k prediction modes; and determining a prediction mode corresponding to a smallest cost value in the k cost values as the target prediction mode.

4. The method of claim 2, further comprising:

determining a colour difference parameter of the n target neighbouring points, wherein the colour difference parameter is used to select a prediction mode; and when the colour difference parameter is less than a preset colour difference threshold, determining the first mode as the target prediction mode;

when the colour difference parameter is greater than or equal to the preset colour difference threshold, determining the target prediction mode from the k prediction modes through a rate-distortion optimization (RDO) method.

5. The method of claim 2, wherein when the target prediction mode is the first mode, determining the predicted value of the attribute information of the current point based on the target prediction mode and the attribute information of the n target neighbouring points comprises:

determining n distance parameters corresponding to the n target neighbouring points; and performing weighted averaging based on the n distance parameters and the attribute information of the n target neighbouring points to obtain the predicted value of the attribute information of the current point.

6. The method of claim 2, wherein when the target prediction mode is the $m^{th}$ mode, determining the predicted value of the attribute information of the current point based on the target prediction mode and the attribute information of the n target neighbouring points comprises:

determining attribute information of a neighbouring point of which an index number is (m−1) in the n target neighbouring points as the predicted value of the attribute information of the current point.

7. The method of claim 2, wherein when the target prediction mode is the $k^{th}$ mode, determining the predicted value of the attribute information of the current point based on the target prediction mode and the attribute information of the n target neighbouring points comprises:

determining a model parameter of a prediction model based on the geometric information and the attribute information of the n target neighbouring points; and determining the predicted value of the attribute information of the current point through the prediction model based on the model parameter and the geometric information of the current point.

8. The method of claim 7, further comprising:

determining, based on the geometric information and an attribute component in the attribute information of the n target neighbouring points, a model parameter corresponding to the attribute component, wherein the attribute component is any component in the attribute information; and determining a predicted value of the attribute component in the attribute information of the current point through the prediction model based on the model parameter and the geometric information of the current point.

9. The method of claim 1, further comprising:

setting a mode parameter indicating to use the target prediction mode; and signaling the mode parameter into a bitstream.

10. A point cloud decoding method, applied to a decoder and comprising:

parsing a bitstream and determining a mode parameter, wherein the mode parameter is used to indicate predicting attribute information of a current point by using a target prediction mode;

when the target prediction mode is a $k^{th}$ mode in k prediction modes, determining n target neighbouring points of the current point, and determining a model parameter of a prediction model based on geometric information and attribute information of the n target neighbouring points, wherein k and n are positive integers; and determining a predicted value of the attribute information of the current point through the prediction model based on the model parameter and geometric information of the current point;

wherein determining the n target neighbouring points of the current point comprises:

determining distance parameters between the current point and one or more candidate neighbouring points in a point cloud; and determining n candidate neighbouring points corresponding to n smallest distance parameters as the n target neighbouring points from the one or more candidate neighbouring points, wherein the distance parameters indicate a distance between two points in the point cloud.

11. The method of claim 10, wherein a first mode in the k prediction modes indicates determining the predicted value of the attribute information of the current point based on a weighted average of the geometric information of the n target neighbouring points;

an $m^{th}$ mode in the k prediction modes indicates determining the predicted value of the attribute information of the current point based on attribute information of a neighbouring point of which an index number is (m−1) in the n target neighbouring points, wherein m is an integer greater than 1 and less than or equal to (n+1); and a $k^{th}$ mode in the k prediction modes indicates determining the predicted value of the attribute information of the current point based on the geometric information and the attribute information of the n target neighbouring points.

12. The method of claim 11, further comprising:

when the target prediction mode is the first mode in the k prediction modes, determining n distance parameters corresponding to the n target neighbouring points; and performing weighted averaging based on the n distance parameters and the attribute information of the n target neighbouring points, to obtain the predicted value of the attribute information of the current point.

13. The method of claim 11, further comprising:

when the target prediction mode is the $m^{th}$ mode in the k prediction modes, determining the attribute information of the neighbouring point of which the index number is (m−1) in the n target neighbouring points as the predicted value of the attribute information of the current point.

14. The method of claim 10, further comprising:

determining, based on the geometric information and an attribute component in the attribute information of the n target neighbouring points, a model parameter corresponding to the attribute component, wherein the attribute component is any component in the attribute information; and determining a predicted value of the attribute component in the attribute information of the current point through the prediction model based on the model parameter and the geometric information of the current point.

15. The method of claim 14, further comprising:

when the predicted value of the attribute component is beyond a preset component range, setting the predicted value of the attribute component in the attribute information of the current point based on the preset component range.

16. The method of claim 11, further comprising:

determining (k−1) prediction modes based on the geometric information of the n target neighbouring points; wherein a first mode in the (k−1) prediction modes indicates determining the predicted value of the attribute information of the current point based on the weighted average of the geometric information of the n target neighbouring points;

an $m^{th}$ mode in the (k−1) prediction modes indicates determining the predicted value of the attribute information of the current point based on attribute information of a neighbouring point of which an index number is (m−1) in the n target neighbouring points; and a (k−1) th mode in the (k−1) prediction modes indicates determining the predicted value of the attribute information of the current point based on the geometric information and the attribute information of the n target neighbouring points.

17. The method of claim 11, further comprising:

an $i^{th}$ mode in the k prediction modes indicates determining the predicted value of the attribute information of the current point based on the geometric information and the attribute information of the n target neighbouring points, wherein i is an integer greater than 1 and less than or equal to m; and the $k^{th}$ mode in the k prediction modes indicates determining the predicted value of the attribute information of the current point based on attribute information of a neighbouring point of which an index number is (i−1) in the n target neighbouring points.

18. A decoder, comprising a second processor and a second memory storing instructions executable by the second processor, wherein the instructions, when executed by the second processor, implement a point cloud decoding method, the method comprising:

parsing a bitstream and determining a mode parameter, wherein the mode parameter is used to indicate predicting attribute information of a current point by using a target prediction mode;

when the target prediction mode is a $k^{th}$ mode in k prediction modes, determining n target neighbouring points of the current point, and determining a model parameter of a prediction model based on geometric information and attribute information of the n target neighbouring points, wherein k and n are positive integers; and determining a predicted value of the attribute information of the current point through the prediction model based on the model parameter and geometric information of the current point;

wherein determining the n target neighbouring points of the current point comprises:

determining distance parameters between the current point and one or more candidate neighbouring points in a point cloud; and determining n candidate neighbouring points corresponding to n smallest distance parameters as the n target neighbouring points from the one or more candidate neighbouring points, wherein the distance parameters indicate a distance between two points in the point cloud.

\* \* \* \* \*